(12) United States Patent
Yaguchi et al.

(10) Patent No.: US 8,984,877 B2
(45) Date of Patent: Mar. 24, 2015

(54) HEAT EXCHANGER FOR STIRLING ENGINE

(75) Inventors: Hiroshi Yaguchi, Susono (JP); Daisaku Sawada, Gotemba (JP); Masaaki Katayama, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 406 days.

(21) Appl. No.: 13/578,920

(22) PCT Filed: Mar. 26, 2010

(86) PCT No.: PCT/JP2010/055408
§ 371 (c)(1),
(2), (4) Date: Aug. 14, 2012

(87) PCT Pub. No.: WO2011/118033
PCT Pub. Date: Sep. 29, 2011

(65) Prior Publication Data
US 2012/0318486 A1  Dec. 20, 2012

(51) Int. Cl.
*F01B 29/10* (2006.01)
*F02G 1/055* (2006.01)
*F28F 13/08* (2006.01)
*F28D 7/06* (2006.01)
*F28D 7/16* (2006.01)

(52) U.S. Cl.
CPC .......... *F02G 1/055* (2013.01); *F28F 13/08* (2013.01); *F28D 7/06* (2013.01); *F28D 7/1623* (2013.01); *F02G 2254/15* (2013.01); *F02G 2255/00* (2013.01); *F28F 2210/08* (2013.01)
USPC .............................................. 60/524; 60/517

(58) Field of Classification Search
USPC .................................................. 60/517–526
See application file for complete search history.

(56) References Cited

U.S. PATENT DOCUMENTS

| | | | |
|---|---|---|---|
| 3,991,457 A * | 11/1976 | Barton | 29/890.038 |
| 4,183,213 A | 1/1980 | Rao | |
| 4,214,447 A * | 7/1980 | Barton | 60/525 |
| 4,422,292 A * | 12/1983 | Hoshino | 60/525 |
| 4,499,727 A * | 2/1985 | Lorant | 60/525 |
| 5,003,778 A * | 4/1991 | Erber et al. | 60/517 |
| 7,581,393 B2 * | 9/2009 | Yaguchi et al. | 60/521 |

FOREIGN PATENT DOCUMENTS

| | | |
|---|---|---|
| JP | 54-22044 A | 2/1979 |
| JP | 06-193506 A | 7/1994 |
| JP | 10-213012 A | 8/1998 |
| JP | 2000-027701 A | 1/2000 |
| JP | 2003-148845 A | 5/2003 |
| JP | 2005-180358 A | 7/2005 |

OTHER PUBLICATIONS

International Search Report of PCT/JP2010/055408 dated Jul. 6, 2010.

* cited by examiner

*Primary Examiner* — Hoang Nguyen
(74) *Attorney, Agent, or Firm* — Sughrue Mion, PLLC

(57) ABSTRACT

A heat exchanger for a stirling engine 10A of a twin-cylinder α type includes a heat transfer tube group 70A formed with heat transfer tubes 71A causing a working fluid of the stirling engine 10A to flow between a high-temperature cylinder 20 and a low-temperature cylinder 30 arranged linearly and parallel to each other in the stirling engine. The heat transfer tube group 70A includes a rising section G1 extending upward, a falling section G2 extending downward, and a connecting section G3 connecting the rising section G1 and the falling section G2 in a turn-back manner, where the heat transfer tube group 70A is regarded as extending from one end or the other end thereof.

10 Claims, 13 Drawing Sheets

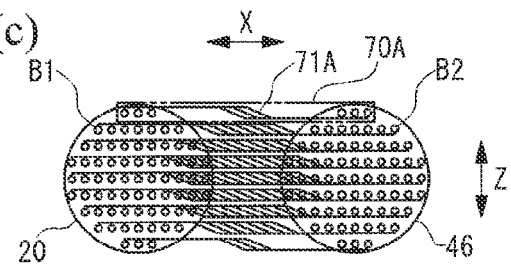
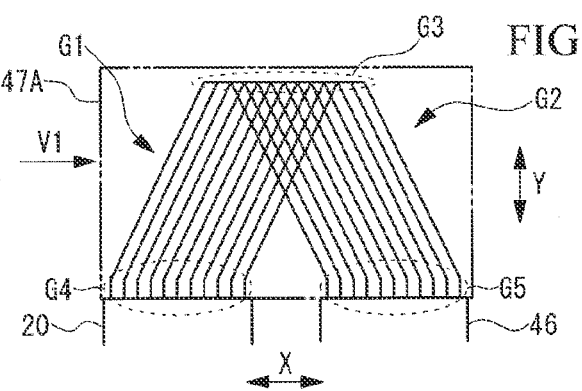
FIG. 5(c)
FIG. 5(b)
FIG. 5(a)
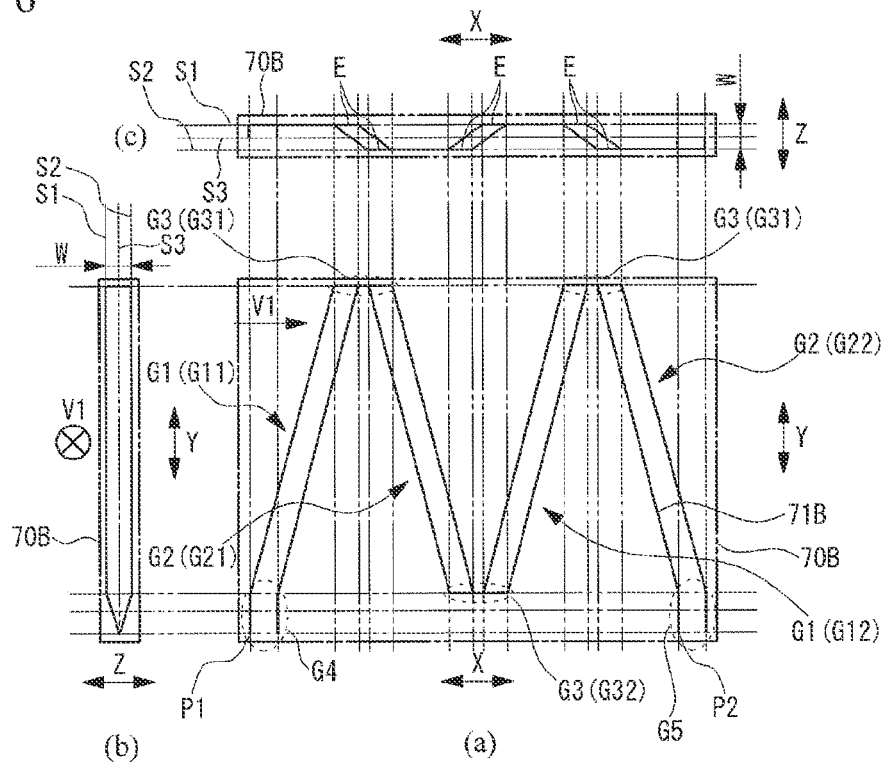
FIG. 6

$\theta_1 = \theta_2 \leq 90\deg$     $\theta_2 < \theta_1 \leq 90\deg$     $\theta_1 < \theta_2 \leq 90\deg$ (a)            (b)            (c)

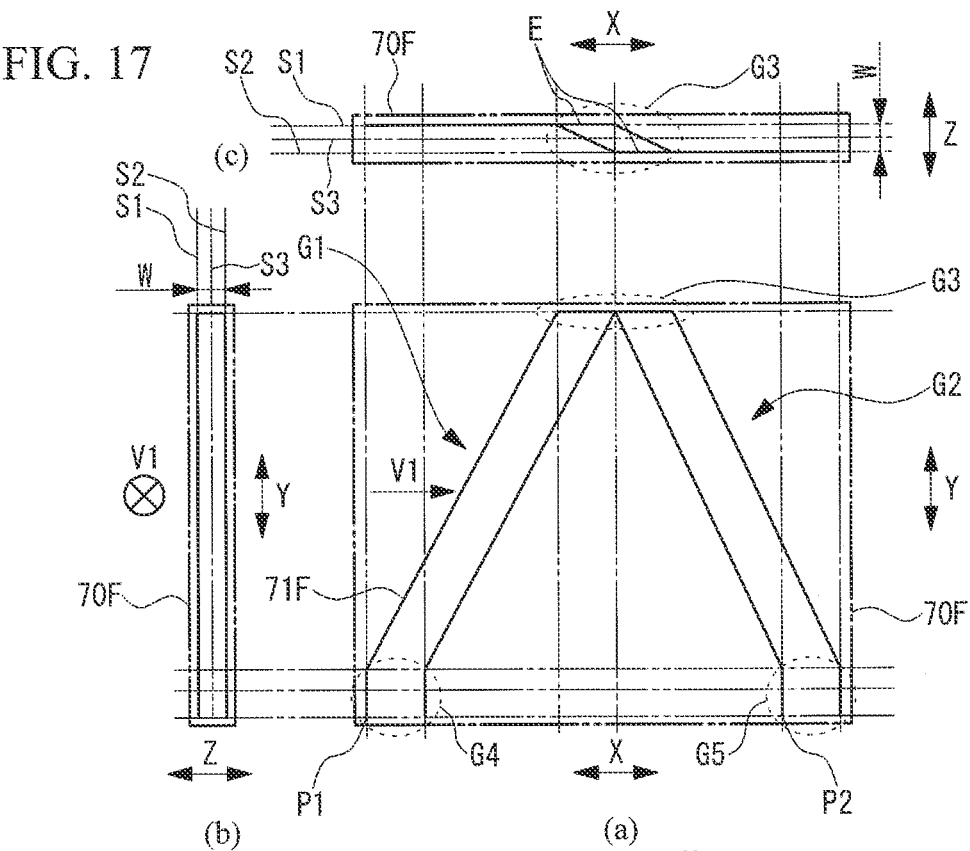
FIG. 17
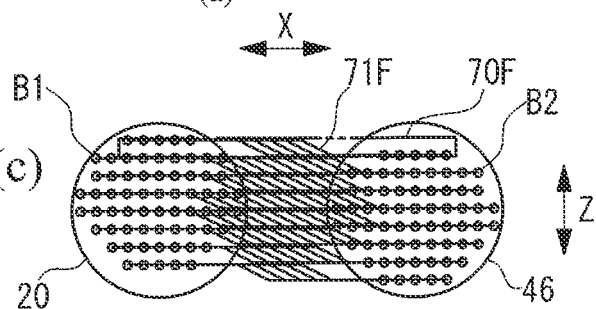
FIG. 18(c)
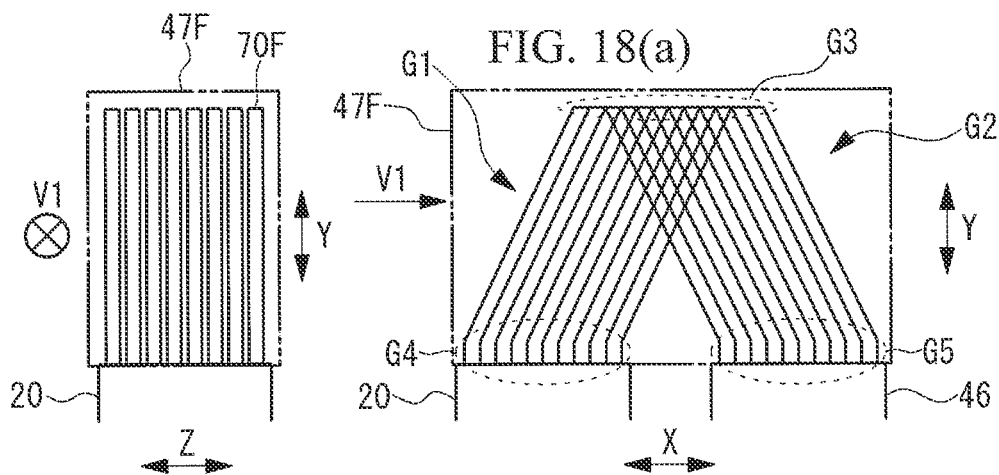
FIG. 18(b)
FIG. 18(a)

FIG. 19
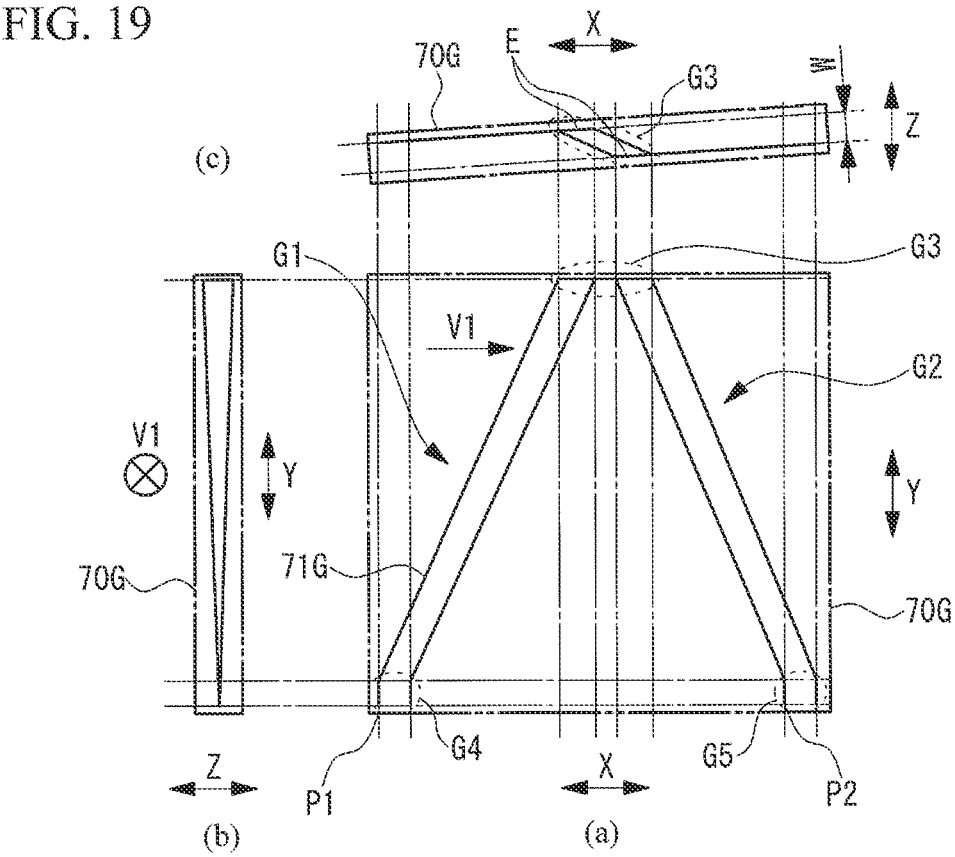
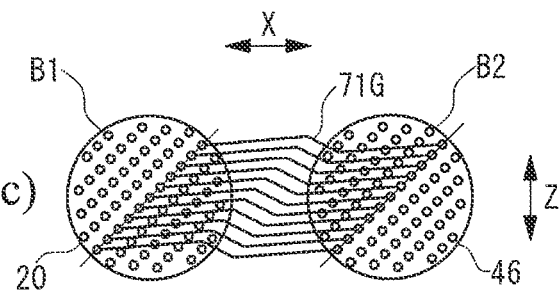
FIG. 20(c)
FIG. 20(b)
FIG. 20(a)
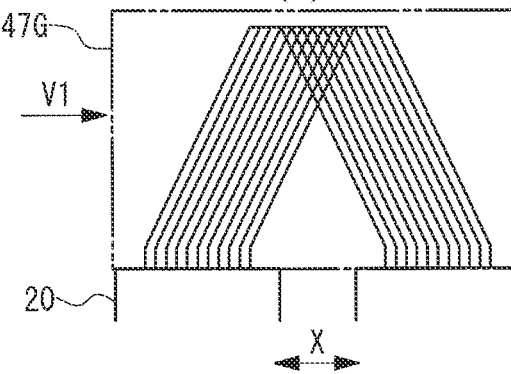

HEAT EXCHANGER FOR STIRLING ENGINE

CROSS REFERENCE TO RELATED APPLICATIONS

This application is a National Stage of International Application No. PCT/JP2010/055408 filed Mar. 26, 2010, the contents of all of which are incorporated herein by reference in their entirety.

TECHNICAL FIELD

The present invention relates to heat exchangers for stirling engines, and more particularly, to a heat exchanger for a stirling engine of a twin-cylinder α type. This heat exchanger has a tube group including tubes that cause the working fluid of the stirling engine to flow between the two cylinders of the stirling engine.

BACKGROUND ART

In recovering exhaust heat from internal-combustion engines mounted on vehicles such as passenger cars, buses, and trucks, and recovering exhaust heat from factories, stirling engines have recently been drawing increasing attention for their excellent theoretical thermal efficiency. Stirling engines can be expected to achieve not only high thermal efficiency but also energy saving, as stirling engines are external-combustion engines that heat working fluids from outside and can utilize various kinds of low-temperature-difference alternative energies such as solar heat, geothermal heat, and exhaust heat, regardless of heat sources. Patent Documents 1 and 2 disclose techniques that can be considered relevant to the present invention, as those techniques relate to heat exchangers for stirling engines and more particularly, to heat exchangers including tubes.

PRIOR ART DOCUMENTS

Patent Documents

[Patent Document 1] Japanese Patent Application Publication No. 2005-180358
[Patent Document 2] Japanese Patent Application Publication No. 6-193506

SUMMARY OF THE INVENTION

Problems to be Solved by the Invention

In a case where a shell and tube exchanger or a tubular exchanger is used as the heat exchanger, and a working fluid is made to flow between the two cylinders in a stirling engine of a twin-cylinder α type having the two cylinders arranged linearly and parallel to each other, the heat exchanger is substantially U-shaped, for example. Such a shape is considered reasonable in the structure of a stirling engine of a twin-cylinder α type having two cylinders arranged linearly and parallel to each other. In a substantially U-shaped heat exchanger, however, the tubes located on the inner side of the heat exchanger are shorter than the tubes located on the outer side of the heat exchanger, and have a lower flow resistance than that of the tubes located on the outer side. Therefore, the flow rate of the working fluid is higher in the tubes located on the inner side than in the tubes located on the outer side. Also, the heat exchange time required by the working fluid flowing in the tubes located on the inner side is shorter than the heat exchange time required by the working fluid flowing in the tubes located on the outer side. That is, the action of the working fluid flowing in the tubes located on the inner side becomes relatively large, resulting in a decrease in the thermal efficiency of the stirling engine.

The technique disclosed in Patent Document 1 is to solve such a problem. By the technique disclosed in Patent Document 1, however, it is difficult to provide a larger number of tubes in a heat exchanger, as interferences among the tubes cause a problem, depending on structures such as the structure disclosed in the first embodiment of Patent Document 1. As a result, it is difficult to achieve a high heat exchange capability in some cases. Patent Document 1 does not disclose a structure for providing a larger number of tubes in a heat exchanger. In view of this, there is a demand for heat exchangers each having a structure that can solve those problems in a stirling engine of a twin-cylinder α type in which two cylinders are arranged linearly and parallel to each other.

Therefore, the present invention has been made in view of the above circumstances, and an object thereof is to provide a stirling engine heat exchanger that includes a high-density tube group including tubes, and can achieve a higher heat exchange capability. Such a heat exchanger can further increase the heat exchange capability and manufacturing simplicity.

Means for Solving the Problems

The present invention for solving the problems is a heat exchanger for a stirling engine, comprising a tube group comprising a plurality of tubes configured to cause a working fluid of the stirling engine to flow between two cylinders arranged linearly and parallel to each other in the stirling engine, the stirling engine being of a twin-cylinder α type, wherein the tube group comprises a rising section extending upward, a falling section extending downward, and a connecting section connecting the rising section and the falling section in a turn-back manner, where the tube group is regarded as extending from one end thereof, wherein the rising section is located along a first plane parallel to an aligning direction of the cylinders and an extending direction of the cylinders, and the falling section is located along a second plane parallel to the first plane.

The present invention is preferably configured so that the connecting section is a folded section connecting the rising section and the falling section in a fold-back manner, the folded section comprises a pair of folded end sections to which the rising section and the falling section are connected, and the pair of folded end sections offset each other, an offset distance between the pair of folded end sections being set at a distance in which a space can be formed between the rising section and the falling section in the offset direction, the rising section and the falling section being arranged to form the space therebetween in the offset direction.

The present invention is preferably configured so that in the tube group, the connecting section comprises a plurality of connecting sections.

The present invention is preferably configured so that in the tube group, the connecting section comprises a plurality of connecting sections, and a rising section formed by the plurality of connecting sections is located along the first plane, and a falling section formed by the plurality of connecting sections is located along the second plane.

The present invention is preferably configured so that the tubes have the same lengths.

The present invention is preferably configured so that the tubes have the same lengths and the same shapes.

The present invention is preferably configured so that a partial density of the tubes in the connecting section is higher than a partial density of the tubes in the rising section and the falling section.

The present invention is preferably configured so that the tubes each have a form that is asymmetrical and is tilted to one end, and the tube group comprises a first partial tube group and a second partial tube group arranged to tilt the tilted forms away from each other, one end and the other end of the first partial tube group facing the opposite direction of one end and the other end of the second partial tube group.

The present invention is preferably configured so that in the first partial tube group, the rising section is located along the first plane, and the falling section is located along the second plane, and in the second partial tube group, the rising section is located along the second plane, and the falling section is located along the first plane.

The present invention is preferably configured so that the connecting section comprises a plurality of connecting sections, and of the connecting sections, respective connecting sections connecting the rising section and the falling section in such a manner to turn back the falling section toward the rising section fall within respective corresponding ranges each having a length calculated by dividing a bore pitch length of the two cylinders by the number of the respective connecting sections, the respective corresponding ranges equally dividing a range having a length equal to the bore pitch length, the connecting sections being sequentially arranged from one end to the other end when the one end being regarded as a starting point.

Effects of the Invention

According to the present invention, a high-density tube group including tubes can be provided, and a higher heat exchange capability can be achieved accordingly. According to the present invention, the heat exchange capability can be further increased, and the degree of manufacturing simplicity can also be made higher.

BRIEF DESCRIPTION OF THE DRAWINGS

FIGS. 5(a), 5(b) and 5(c) are diagrams showing the heater according to the first embodiment, wherein FIG. 5(a) is a front view; FIG. 5(b) is a side view; and FIG. 5(c) is a top view;

FIG. 6 is a diagram showing heat transfer tubes and a heat transfer tube group according to a second embodiment, wherein part (a) is a front view; part (b) is a side view; and part (c) is a top view;

FIGS. 7(a), 7(b) and 7(c) are diagrams showing a heater according to the second embodiment, wherein FIG. 7(a) is a front view; FIG. 7(b) is a side view; and FIG. 7(c) is a top view;

FIG. 17 is a diagram showing a third modification of heat transfer tubes and a heat transfer tube group, wherein part (a) is a front view; part (b) is a side view; and part (c) is a top view;

FIGS. 18(a), 18(b) and 18(c) are diagrams showing a heater according to the third modification, wherein FIG. 18(a) is a front view; FIG. 18(b) is a side view; and FIG. 18(c) is a top view;

FIG. 19 is a diagram showing a fourth modification of heat transfer tubes and a heat transfer tube group, wherein part (a) is a front view; part (b) is a side view; and part (c) is a top view; and FIGS. 20(a), 20(b) and 20(c) are diagrams showing a heater according to the fourth modification: FIG. 20(a) is a front view, wherein FIG. 20(b) is a side view; and FIG. 20(c) is a top view.

MODES FOR CARRYING OUT THE INVENTION

The following is a detailed description of embodiments for carrying out the invention, with reference to the drawings.

First Embodiment

Figure 1:
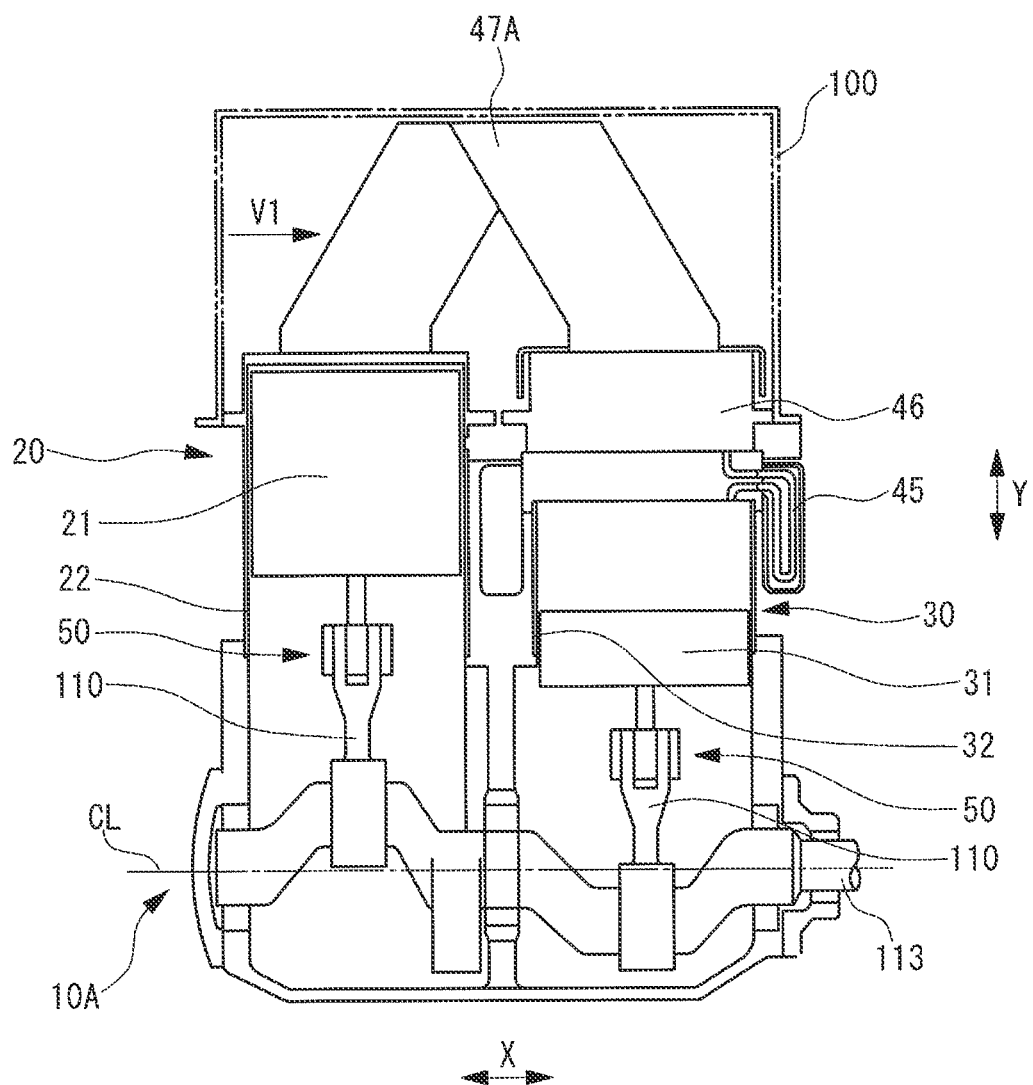
FIG. 1 is a diagram showing a stirling engine including a heater according to a first embodiment.

FIG. 1 is a schematic view of a stirling engine 10A that includes a heater 47A as a heat exchanger for the stirling engine 10A according to this embodiment. The stirling engine 10A is of a twin-cylinder α type. The stirling engine 10A includes a high-temperature cylinder 20 and a low-temperature cylinder 30 as a pair of cylinders. The cylinders 20 and 30 are arranged linearly and parallel to each other so that the extending direction of a crankshaft axis CL and the cylinder-engine aligning direction X become parallel to each other. The high-temperature cylinder 20 includes an expansion piston 21 and a high-temperature cylinder housing 22, and the low-temperature cylinder 30 includes a compression piston 31 and a low-temperature cylinder housing 32. A phase difference is formed so that the compression piston 31 lags behind the expansion piston 21 in movement by a crank angle of approximately 90 degrees.

The space existing on the upper side of the high-temperature cylinder housing 22 is an expansion space. A working fluid heated by the heater 47A flows into the expansion space. Specifically, the heater 47A is placed inside an exhaust pipe 100 of a gasoline engine mounted in a vehicle in this embodiment. In view of this, the stirling engine 10A is positioned so that the extending direction of the crankshaft axis CL (in the other words, the cylinder-engine aligning direction X) becomes parallel to an exhaust gas flowing direction V1. In the heater 47A, the working fluid is heated by thermal energy recovered from an exhaust gas that is a fluid serving as a high-temperature heat source.

The space existing on the upper side of the low-temperature cylinder housing 32 is a compression space. The working fluid cooled by a cooler 45 flows into the compression space.

A regenerator 46 exchanges heat with the working fluid flowing back and forth between the expansion and compression spaces. Specifically, the regenerator 46 receives heat from the working fluid when the working fluid flows from the expansion space to the compression space. The regenerator 46 emits stored heat to the working fluid when the working fluid flows from the compression space to the expansion space.

In this embodiment, air is used as the working fluid. However, the working fluid is not limited to that, and a gas such as He, $H_2$, or $N_2$ can be used as the working fluid.

Next, operations of the stirling engine 10A are described. Heated by the heater 47A, the working fluid expands and pushes down the expansion piston 21. As a result, a crankshaft 113 is rotated. When the expansion piston 21 moves on to an ascending process, the working fluid is transferred to the regenerator 46 through the heater 47A. The working fluid releases heat in the regenerator 46 and flows into the cooler 45. The working fluid cooled in the cooler 45 flows into the compression space, and is compressed as the compression piston 31 moves on to an ascending process. The working fluid compressed in the above manner becomes higher in temperature while receiving heat from the regenerator 46 in turn. The working fluid then flows into the heater 47A. In the heater 47A, the working fluid is again heated and expanded. That is, the stirling engine 10A is operated through the reciprocating flow of the working fluid.

In this embodiment, the heat source for the stirling engine 10A is the exhaust gas from the internal combustion engine of a vehicle. Therefore, there is a limit to the amount of heat that can be obtained, and the stirling engine 10A needs to be operated based on the amount that can be obtained. In view of this, the internal friction inside the stirling engine 10A is reduced to the smallest possible amount in this embodiment. Specifically, to eliminate the frictional loss caused by the piston ring with the largest frictional loss in the internal friction inside the stirling engine 10A, gas lubrication is performed between the cylinder housings 22 and 32 and the pistons 21 and 31.

In the gas lubrication, the pistons 21 and 31 are made to float in the air by utilizing the air pressure (distribution) generated in the minute clearances between the cylinder housings 22 and 32 and the pistons 21 and 31. Since the sliding resistance in the gas lubrication is extremely low, the internal friction inside the stirling engine 10A can be greatly reduced. The gas lubrication for making an object to float in the air may be static-pressure gas lubrication for making an object to float by virtue of a static pressure generated by ejecting a pressurized fluid, for example. However, the gas lubrication is not limited to that, and may also be dynamic-pressure gas lubrication, for example.

Each of the clearances in which the gas lubrication is performed between the cylinder housings 22 and 32 and the pistons 21 and 31 is approximately several tens of micrometers. The working fluid of the stirling engine 10A is present in those clearances. The pistons 21 and 31 are supported in a non-contact state or in an allowable contact state with respect to the cylinder housings 22 and 32, respectively. Therefore, piston rings are not provided around the pistons 21 and 31, and lubrication oil, which is normally used in conjunction with piston rings, is not used, either. In the gas lubrication, the minute clearances maintain the airtightness of the expansion and compression spaces, and are sealed without rings and oil.

Furthermore, the pistons 21 and 31 and the cylinder housings 22 and 32 are made of metals. Specifically, the piston 21 and the corresponding cylinder housing 22 are made of metals (SUS in this embodiment) having the same linear expansion coefficients, while the piston 31 and the corresponding cylinder housing 32 are made of metals (SUS in this embodiment) having the same linear expansion coefficients in this embodiment. With this arrangement, even when thermal expansion occurs, gas lubrication can be performed while appropriate clearances are maintained.

Where gas lubrication is performed, the load capability is low. Therefore, side forces against the pistons 21 and 31 need to be made substantially zero. That is, where gas lubrication is performed, the cylinder housings 22 and 32 each have a low capability (pressure resisting capability) to resist forces in the diametrical direction (the lateral direction or thrust direction) of the cylinder housings 22 and 32. Therefore, linear movement of the pistons 21 and 31 with respect to the axis lines of the cylinder housings 22 and 32 needs to be highly accurate.

In view of this, grasshopper mechanisms 50 are provided in the piston/crank sections in this embodiment. Other than the grasshopper mechanisms 50, examples of mechanisms to realize linear movement include watt mechanisms. However, the size required for each of the grasshopper mechanisms 50 to achieve a certain linear movement accuracy is smaller than that of any other mechanism. Accordingly, the entire apparatus can be advantageously made smaller in size. Particularly, as the stirling engine 10A of this embodiment is to be set in a limited space under the floor of a vehicle, an apparatus with a smaller size allows a higher degree of freedom in installation. Also, the weight required for each of the grasshopper mechanisms 50 to achieve a certain linear movement accuracy is smaller than that of any other mechanism, and accordingly, the grasshopper mechanisms 50 also have an advantage in energy efficiency. Furthermore, the structures of the grasshopper mechanisms 50 are relatively simple, and accordingly, the grasshopper mechanisms 50 can be easily formed (manufactured or assembled).

Figure 2:
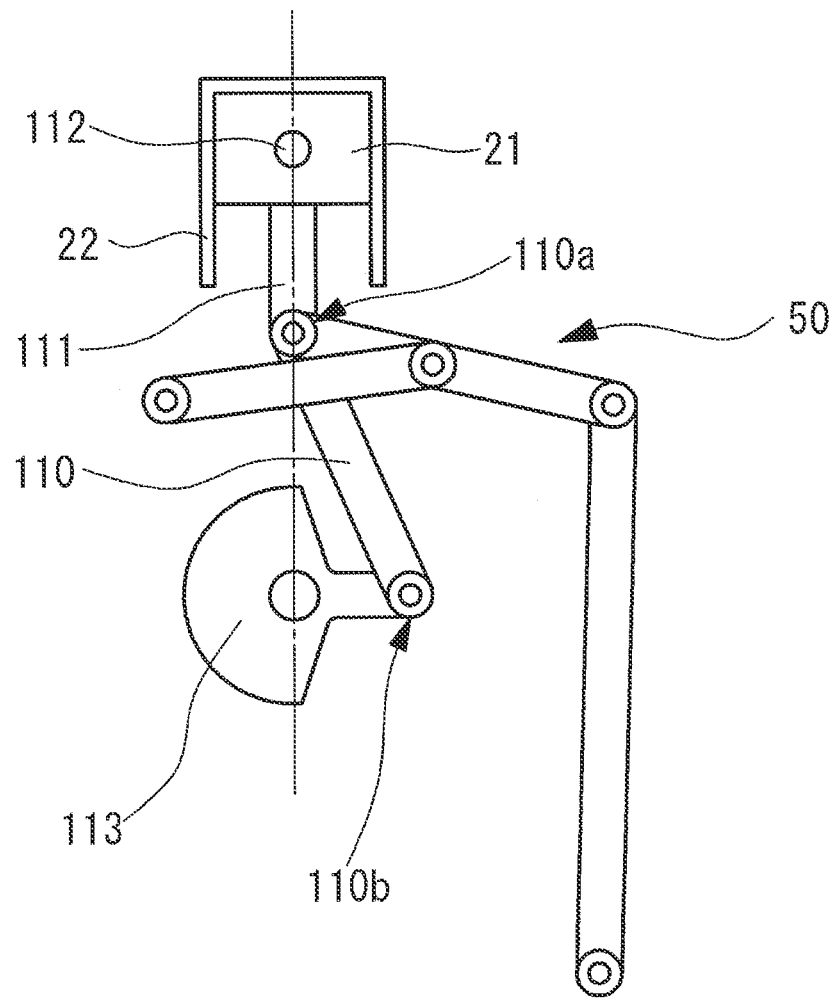
FIG. 2 is a diagram schematically showing the structure of a piston/crank section in the stirling engine according to the first embodiment.

FIG. 2 is a schematic view showing the outline of the structure of a piston/crank section in the stirling engine 10A. Since the piston/crank sections of the high-temperature cylinder 20 and the low-temperature cylinder 30 have the same structures, only the piston/crank section of the high-temperature cylinder 20 will be described below, and an explanation of that of the low-temperature cylinder 30 will not be provided. The approximate straight-line mechanism includes a grasshopper mechanism 50, a connecting rod 110, an extension rod 111, and a piston pin 112. The expansion piston 21 is connected to the crankshaft 113 via the connecting rod 110, the extension rod 111, and the piston pin 112. Specifically, the expansion piston 21 is connected to one end of the extension rod 111 via the piston pin 112. The smaller end 110a of the connecting rod 110 is connected to the other end of the extension rod 111. The larger end 110b of the connecting rod 110 is connected to the crankshaft 113.

The reciprocating movement of the expansion piston 21 is transferred to the crankshaft 113 through the connecting rod 110, and is converted into rotational movement therein. The connecting rod 110 is supported by the grasshopper mechanism 50, and causes the expansion piston 21 to linearly reciprocate. As the connecting rod 110 is supported by the grasshopper mechanisms 50, the side force F against the expansion piston 21 is substantially zero. Accordingly, the expansion piston 21 can be suitably supported, even when gas lubrication with a low load capability is performed.

Figure 3:
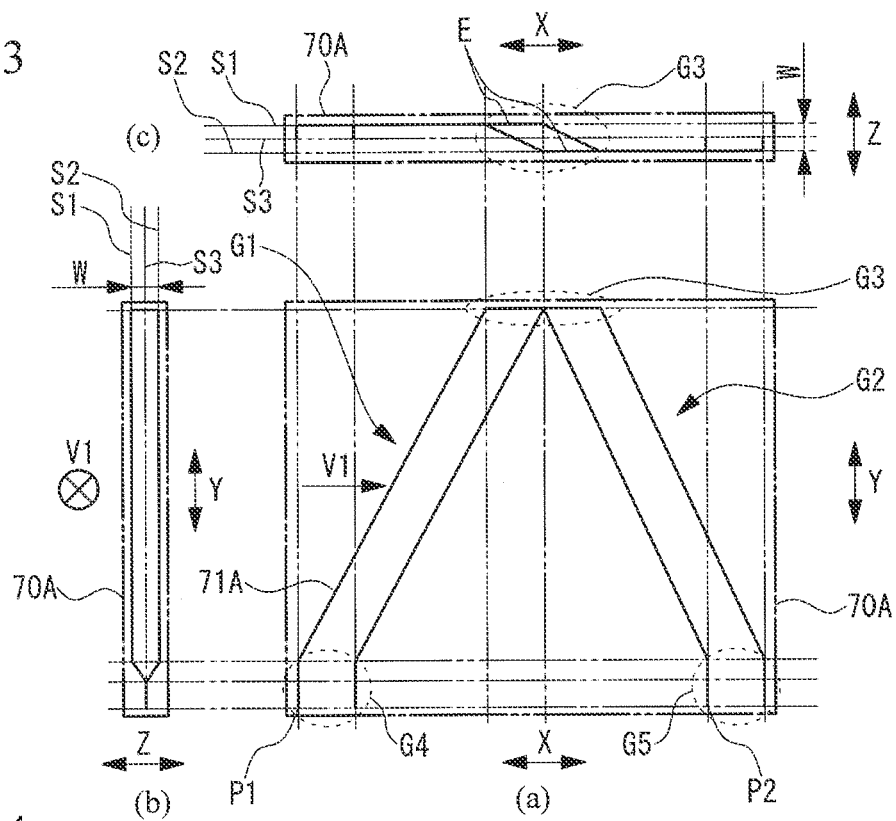
FIG. 3 is a diagram showing heat transfer tubes and a heat transfer tube group according to the first embodiment, wherein part (a) is a front view; part (b) is a side view; and part (c) is a top view.

Referring now to FIG. 3, the heater 47A is described with greater detail. The heater 47A is a multitubular heat exchanger, and includes heat transfer tubes 71A equivalent to the tubes for circulating the working fluid. Each of the heat transfer tubes 71A is axisymmetrical about the center axis thereof, and specifically, has a substantially V-shaped form. A first working fluid inlet/outlet P1 is formed at one end of each heat transfer tube 71A, and a second working fluid inlet/outlet P2 is provided at the other end. Specifically, SUS tubes are used as the heat transfer tubes 71A.

The heat transfer tubes 71A constitute a heat transfer tube group 70A. In FIG. 3, two heat transfer tubes 71A are shown as the heat transfer tubes 71A constituting the heat transfer tube group 70A, for ease of explanation. Specifically, the heat transfer tube group 70A is formed with the heat transfer tubes 71A arranged as a group in a single row. More specifically, the heat transfer tube group 70A is formed with the heat transfer tubes 71A that are arranged linearly and parallel to one another at regular intervals. In view of this, the heat transfer tubes 71A constituting the heat transfer tube group 70A are arranged linearly with respect to one another in the cylinder aligning direction X. Accordingly, each of the heat transfer tubes 71A has a horizontally symmetrical form when seen in a direction Z perpendicular to the cylinder aligning direction X and the cylinder extending direction Y, with the cylinder aligning direction X being regarded as the horizontal direction as shown in FIG. 3(a). The heat transfer tubes 71A constituting the heat transfer tube group 70A have the same lengths and the same shapes. The heat transfer tube group 70A has a rising section G1, a falling section G2, a folded section G3, one end section G4, and the other end section G5.

The rising section G1 is the middle portion extending upward when the heat transfer tube group 70A is regarded as extending from one end. Specifically, in a case where the heat transfer tubes 71A are regarded as extending from one end in the cylinder extending direction Y, the rising section G1 is formed by arranging the upwardly extending middle portions of the heat transfer tubes 71A in a single row in the cylinder aligning direction X, as the middle portions extend so as to become closer to the other end in the cylinder aligning direction X. The rising section G1 formed in this manner is located along a first plane S1. The first plane S1 is a plane parallel to the cylinder aligning direction X and the cylinder extending direction Y.

The falling section G2 is the middle portion extending downward when the heat transfer tube group 70A is regarded as extending from one end. Specifically, in a case where the heat transfer tubes 71A are regarded as extending toward the other end in the cylinder extending direction Y, the falling section G2 is formed by arranging the downwardly extending middle portions of the heat transfer tubes 71A in a single row in the cylinder aligning direction X, as the middle portions extend from the one end in the cylinder aligning direction X. The falling section G2 formed in this manner is located along a second plane S2. The second plane S2 is a plane parallel to the cylinder aligning direction X and the cylinder extending direction Y. That is, the second plane S2 is parallel to the first plane S1.

The folded section G3 is a section that connects the rising section G1 and the falling section G2 as if to fold back those sections. In view of this, the folded section G3 is equivalent to the connecting section that connects the rising section G1 and the falling section G2 in a turn-back manner. Specifically, of the heat transfer tubes 71A, the portions that connect the parts forming the rising section G1 to the portions forming the falling section G2 in a direction that intersects with the cylinder aligning direction X and is perpendicular to the cylinder extending direction Y are arranged as a group in a single row in the cylinder aligning direction X. In this manner, the folded section G3 is formed.

The folded section G3 includes a pair of folded end sections E to which the rising section G1 and the falling section G2 are connected. The pair of folded end sections E offset each other, and specifically, equally offset each other in an offset direction that is the direction Z. The offset distance of the pair of folded end sections E is set at a distance W in which a space can be formed between the rising section G1 and the falling section G2 in the offset direction. Accordingly, there is an offset distance W between the first and second planes S1 and S2. The offset distance W is allowed between the rising section G1 located along the first plane S1 and the falling section G2 located along the second plane S2 parallel to the first plane S1, so that a space is formed in the offset direction when seen in the cylinder aligning direction X as shown in FIG. 3(b).

Figure 4:
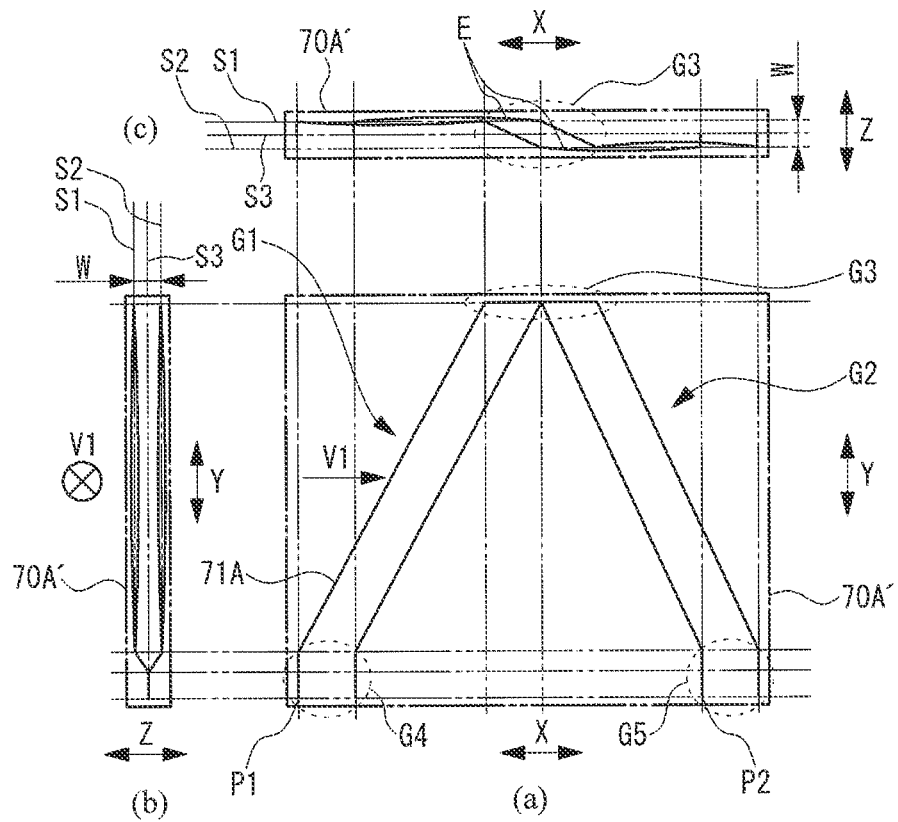
FIG. 4 is a diagram for further explaining the heat transfer tubes and the heat transfer tube group, wherein part (a) is a front view; part (b) is a side view; and part (c) is a top view.

In a case where the rising section G1 is located along a plane (the first plane S1 in this embodiment), the portions of the heat transfer tubes 71A forming the rising section G1 may not be located strictly in the plane, as in a heat transfer tube group 70A' shown in FIG. 4, for example. The same applies not only to the falling section G2 but also to other sections such as the folded section G3, and further applies to the other embodiments. In this regard, a situation like the one illustrated in FIG. 4 can occur to a greater or lesser extent due to manufacturing errors, for example. On the other hand, even in the situation illustrated in FIG. 4, the distance W is set at such an offset distance that the rising section G1 and the falling section G2 located along planes do not overlap each other when seen in the cylinder aligning direction X as shown in FIG. 4(c). In view of this, the distance W should be longer than the width of the heat transfer tubes 71A.

Referring back to FIG. 3, the one end section G4 is the end section provided on the side of the high-temperature cylinder 20. Specifically, of the heat transfer tubes 71A, the portions formed with the parts extending upward in the cylinder extending direction Y from one end located at a middle point between the first and second planes S1 and S2, and the parts that extend from the aforementioned parts to the first plane S1 obliquely upward with respect to the cylinder extending direction Y while extending perpendicularly to the cylinder aligning direction X and are connected to the portions forming the rising section G1 are arranged as a group in a single row in the cylinder aligning direction X. In this manner, the one end section G4 is formed.

The other end section G5 is the end section provided on the side of the low-temperature cylinder 30. Specifically, of the heat transfer tubes 71A, the portions formed with the parts extending upward in the cylinder extending direction Y from the other end located at a middle point between the first and second planes S1 and S2, and the parts that extend from the aforementioned parts to the second plane S2 obliquely upward with respect to the cylinder extending direction Y while extending perpendicularly to the cylinder aligning direction X and are connected to the portions forming the falling section G2 are arranged as a group in a single row in the cylinder aligning direction X. In this manner, the other end section G5 is formed.

The one end section G4 and the other end section G5 serve as the sections that can adjust the positions of one end and the other end of the heat transfer tube group 70A in the cylinder extending direction Y in a case where the positions of the upper portions of the high-temperature cylinder 20 and the regenerator 46 in the cylinder extending direction Y differ from each other.

In the heat transfer tube group 70A, the first working fluid inlets/outlets P1 provided in the one end section G4 are arranged in the same straight line. Also, the second working fluid inlets/outlets P2 provided in the other end section G5 are arranged in the same straight line. Further, each of the first and second working fluid inlets/outlets P1 and P2 is located in a third plane S3 parallel to the cylinder aligning direction X and the cylinder extending direction Y (or parallel to the first and second planes S1 and S2). In view of this, the third plane S3 is located in the middle position between the first and second planes S1 and S2. Accordingly, the first and second planes S1 and S2 are planes parallel to each other, with the third plane S3 including the first and second working fluid inlets/outlets P1 and P2 being interposed in between.

In the heat transfer tube group 70A, the partial density of the heat transfer tubes 71A in the folded section G3 is higher than the partial density of the heat transfer tubes 71A in the rising section G1 and the falling section G2 In the heat transfer tube group 70A, the intervals between the first working fluid inlets/outlets P1, the intervals between the second working fluid inlets/outlets P2, and the intervals between the heat transfer tubes 71A in the pair of folded end sections E are the same. Therefore, in the heat transfer tube group 70A, the acute angle formed by the folded section G3 with respect to the direction Z when seen in the cylinder extending direction Y as shown in FIG. 3(c) is made larger than each of the acute angles formed by the rising section G1 and the falling section G2 with respect to the cylinder extending direction Y when seen in the direction Z as shown in FIG. 3(a). With this arrangement, the intervals between the heat transfer tubes 71A in the folded section G3 are made shorter than the intervals between the heat transfer tubes 71A in the rising section G1 and the falling section G2. In this manner, the partial densities are set as described above.

This heat transfer tube group 70A is used in the heater 47A as specifically illustrated in FIGS. 5(a) through 5(c). In the heater 47A, first heat transfer tube connecting ports B1 for connecting the first working fluid inlets/outlets P1 are provided on the side of the high-temperature cylinder 20, as shown in FIG. 5(c). The first heat transfer tube connecting ports B1 are arranged at regular intervals in the cylinder aligning direction X, and are also arranged at regular intervals in the direction Z. Accordingly, of the first heat transfer tube connecting ports B1, those adjacent to one another in the cylinder aligning direction X are arranged the same straight line in the cylinder aligning direction X.

In the heater 47A, second heat transfer tube connecting ports B2 for connecting the second working fluid inlets/outlets P2 are provided on the side of the low-temperature cylinder 30, as shown in FIG. 5(c). The second heat transfer tube connecting ports B2 are arranged at regular intervals in the cylinder aligning direction X, and are also arranged at regular intervals in the direction Z. Accordingly, of the second heat transfer tube connecting ports B2, those adjacent to one another in the cylinder aligning direction X are arranged the same straight line in the cylinder aligning direction X.

The number of the first heat transfer tube connecting ports B1 is the same as the number of the second heat transfer tube connecting ports B2. The intervals between the first heat transfer tube connecting ports B1 in the cylinder aligning direction X are the same as the intervals between the second heat transfer tube connecting ports B2 in the cylinder aligning direction X, and the intervals between the first heat transfer tube connecting ports B1 in the direction Z are also the same as the intervals between the second heat transfer tube connecting ports B2 in the direction Z. Further, in a case where the first and second heat transfer tube connecting ports B1 and B2 are located in the same positions in the direction Z, the number of the first heat transfer tube connecting ports B1 provided in the cylinder aligning direction X is the same as the number of the second heat transfer tube connecting ports B2 provided in the cylinder aligning direction X. Accordingly, in each position in the direction Z, an equal number of first and second heat transfer tube connecting ports B1 and B2 are provided at regular intervals in the same straight line in the cylinder aligning direction X. The intervals between the first and second transfer tube connecting ports B1 and B2 arranged in the same layouts are the same as the intervals between the first and second working fluid inlets/outlets P1 and P2 of the heat transfer tubes 71A.

In the heater 47A, the heat transfer tubes 71A are provided for the respective first and second heat transfer tube connecting ports B1 and B2 arranged in the same layouts. In each position in the direction Z, the heat transfer tubes 71A that are arranged linearly and parallel to one another at regular intervals in the cylinder aligning direction X are provided for the first and second heat transfer tube connecting ports B1 and B2 arranged in the same straight line in the cylinder aligning direction X. In this manner, heat transfer tube groups 70A are formed. In each of the heat transfer tube groups 70A, the rising section G1 and the falling section G2 are provided to form a space in between when seen in the cylinder aligning direction X as shown in FIG. 5(b). In the hearer 47A, the rising section G1 and the falling section G2 in each heat transfer tube group 70A are provided to have an overlapping portion near the folded section G3 when seen in the offset direction (or in the direction Z) as shown in FIG. 5(a).

Next, the functions and effects of the heater 47A are described. In the heater 47A, each heat transfer tube group 70A has the folded section G3 that connects the falling section G2 to the rising section G1 as if to fold back the falling section G2 toward the rising section G1. In such a structure, the heat transfer tubes 71A constituting the heat transfer tube group 70A can be densely arranged as a group in a single row. Accordingly, the heater 47A can have high-density heat transfer tube groups 70A, and can achieve a high heat exchange capability.

In the heater 47A, the folded section G3 has the pair of folded end sections E that offset each other. If the pair of folded end sections E are not parallel to each other, the layouts of the first and second heat transfer tube connecting ports B1 and B2 become more complicated, or the shapes of the heat transfer tubes 71A become more complicated, for example, in increasing the density of the heat transfer tube groups 70A in the above described manner. Accordingly, with the heater 47A, a higher degree of manufacturing simplicity can be achieved.

In the heater 47A, the offset distance between the pair of folded end sections E is set at the distance W in which a space can be formed between the rising section G1 and the falling section G2 in the offset direction, and the rising section G1 and the falling section G2 are arranged so as to form a space in between in the offset direction. Accordingly, the heater 47A can avoid the problem of interferences of the portions forming the rising section G1 and the portions forming the falling section G2 between the heat transfer tubes 71A in a region near the folded section G3, in increasing the density of the heat transfer tube groups 70A in the above described manner. As a result, the density of the heat transfer tube groups 70A can be suitably increased.

With the above arrangement in the heater 47A, exhaust gas can be made to flow between the rising section G1 and the falling section G2, and as a result, the heat exchange capability can be further increased. In the heater 47A, the direction Z perpendicular to the exhaust gas flowing direction V1 is the offset direction, and the pair of folded end sections E are made to offset each other. Accordingly, the heater 47A can suitably cause exhaust gas to flow in the space between the rising section G1 and the falling section G2 when seen in the cylinder aligning direction X, and can further increase its heat exchange capability.

In the heater 47A, the rising section G1 is located along the first plane S1, and the falling section G2 is located along the second plane S2. If the rising section G1 and the falling section G2 are not located along planes, the layouts of the first and second heat transfer tube connecting ports B1 and B2 become more complicated, or the shapes of the heat transfer tubes 71A become more complicated, for example, in increasing the density of the heat transfer tube groups 70A. Accordingly, with the heater 47A, an even higher degree of manufacturing simplicity can be achieved. Also, with this arrangement, the heater 47A can cause exhaust gas to suitably flow along the rising section G1 and the falling section G2, and can further increase its heat exchange capability.

Furthermore, in the heater 47A, the first and second planes S1 and S2 are planes parallel to the cylinder aligning direction X and the cylinder extending direction Y. Accordingly, the heat transfer tube groups 70A can be provided at a high density in the direction Z perpendicular to those planes S1 and S2. As a result, the heat exchange capability can be further increased.

In the heater 47A, the first working fluid inlets/outlets P1 are arranged in the same straight line, and the second working fluid inlets/outlets P2 are arranged in the same straight line. The first and second working fluid inlets/outlets P1 and P2 are arranged in the third plane S3. Furthermore, in the heater 47A, the first and second working fluid inlets/outlets P1 and P2 are arranged at regular intervals.

If either the first working fluid inlets/outlets P1 or the second working fluid inlets/outlets P2 are not arranged in the same straight line, or if both of the first and second working fluid inlets/outlets P1 and P2 are not arranged in the same straight line, the layouts of the first and second heat transfer tube connecting ports B1 and B2 become more complicated, and the shapes of the heat transfer tubes 71A become more complicated, for example, in increasing the density of the heat transfer tube groups 70A. Also, if the first and second working fluid inlets/outlets P1 and P2 are not located in the third plane S3, the layouts of the first and second heat transfer tube connecting ports B1 and B2 become more complicated, for example. If the first and second working fluid inlets/outlets P1 and P2 are not arranged at regular intervals, an increase in density is hindered when the density of the heat transfer tube groups 70A is increased.

In view of this, the heater 47A can further increase its heat exchange capability, and can achieve an even higher degree of manufacturing simplicity.

In the heater 47A, the heat transfer tubes 71A have the same lengths. Accordingly, the heater 47A can suitably achieve a high heat exchange capability in causing a working fluid to flow between the cylinders 20 and 30 arranged linearly and parallel to each other via the heat transfer tube groups 70A formed with the heat transfer tubes 71A.

In the heater 47A, the heat transfer tubes 71A further have the same shapes. Accordingly, in the heater 47A, the heat transfer tubes 71A can be manufactured as the same components, and an even higher degree of manufacturing simplicity can be achieved. Because of this, the heat transfer tubes 71A can be densely arranged linearly and parallel to one another in an overlapping manner. Accordingly, the density of the heat transfer tube groups 70A can be made even higher, and the heat exchange capability can be further increased.

Furthermore, in the heater 47A, the heat transfer tubes 71A have forms that are axisymmetrical about the center axis. Accordingly, in the heater 47A, higher uniformity can be achieved in increasing the density of the heat transfer tube groups 70A, and the heat exchange capability can be further increased. In view of this, at least the portions of the heat transfer tubes 71A forming the rising section G1, the falling section G2, and the folded section G3 preferably have axisymmetrical forms. Also, in the heater 47A, the first and second working fluid inlets/outlets P1 and P2 are arranged at regular intervals. With this arrangement, the uniformity among the heat transfer tube groups 70A can be made higher, and the heat exchange capability can be further increased.

In the heater 47A, the partial density of the heat transfer tubes 71A in the folded section G3 is made higher than the partial density of the heat transfer tubes 71A in the rising section G1 and the falling section G2. With this arrangement, tight folding can be easily performed. Accordingly, in each heat transfer tube group 70A, the offset distance between the rising section G1 and the falling section G2 can be made shorter. Thus, the heater 47A can include the heat transfer tube groups 70A at a higher density, and can further increase its heat exchange capability.

Second Embodiment

A heater 47B according to this embodiment serves as a multitubular heat exchanger, and includes heat transfer tubes 71B shown in FIG. 6. Instead of the heater 47A, the heater 47B can be provided in the stirling engine 10A, for example. Each of the heat transfer tubes 71B has a form axisymmetrical about the center axis thereof, and specifically, has a substantially M-shaped form. A first working fluid inlet/outlet P1 is provided at one end of each heat transfer tube 71B, and a second working fluid inlet/outlet P2 is provided at the other end.

The heat transfer tubes 71B constitute a heat transfer tube group 70B. In FIG. 6, two heat transfer tubes 71B are shown as the heat transfer tubes 71B constituting the heat transfer tube group 70B, for ease of explanation.

Specifically, the heat transfer tube group 70B is formed with the heat transfer tubes 71B arranged as a group in a single row. More specifically, the heat transfer tube group 70B is formed with the heat transfer tubes 71B arranged linearly and parallel to one another at regular intervals. In view of this, the heat transfer tubes 71B constituting the heat transfer tube group 70B are arranged linearly with respect to one another in the cylinder aligning direction X. Accordingly, when seen in the direction Z, the heat transfer tubes 71B have horizontally symmetrical forms, with the cylindrical engine aligning direction X being regarded as the horizontal direction as shown in FIG. 6(a). The heat transfer tubes 71B constituting the heat transfer tube group 70B have the same lengths and the same shapes.

The heat transfer tube group 70B includes two rising sections G1, two falling sections G2, three folded sections G3, one end section G4, and the other end section G5. In this regard, the folded sections G3 are provided in the heat transfer tube group 70B, so that another rising section G1 and another falling section G2 are added to the structure of the heat transfer tube group 70A. Specifically, the number of the folded sections G3 is an odd number.

Where the heat transfer tube group 70B is specifically regarded as extending from one end, the two rising sections G1 are a rising section G11 located on the side of one end and a rising section G12 located on the side of the other end. Those two rising sections extend parallel to each other, and are located along a first plane S1. The acute angle formed by each of the rising sections G1 with respect to the cylinder extending direction Y is smaller than that in the heat transfer tube group 70A when seen in the direction Z as shown in FIG. 6(a).

Where the heat transfer tube group 70B is specifically regarded as extending from one end, the two falling sections G2 are a falling section G21 located on the side of the one end and a falling section G22 located on the side of the other end. Those two falling sections extend parallel to each other, and are located along a second plane S2. The acute angle formed by each of the falling sections G2 with respect to the cylinder extending direction Y is smaller than that in the heat transfer tube group 70A when seen in the direction Z as shown in FIG. 6(a).

Where the heat transfer tube group 70B is specifically regarded as extending from one end, the three folded sections G3 include two folded sections G31 that connect the rising sections G1 and the falling sections G2 as if to fold back the falling sections G2 toward the rising sections G1, and a folded section G32 that connects a rising section G1 and a falling section G2 as if to fold back the rising section G1 toward the falling section G2. The two folded sections G31 are located at both ends of the heat transfer tube group 70B, and the folded section G32 is located at the center of the heat transfer tube group 70B. The acute angle formed by each of the three folded sections G3 with respect to the direction Z is smaller than that in the heat transfer tube group 70A when seen in the cylinder extending direction Y as shown in FIG. 6(c). At each of the three folded sections G3, a pair of folded end sections E is provided as in the heat transfer tube group 70A. An offset distance that is a distance W is set between the rising sections G1 and the falling sections G2, so that a space is formed in the offset direction between those sections when seen in the cylinder aligning direction X as shown in FIG. 6(b).

In the heat transfer tube group 70B, the acute angle formed by each of the rising sections G1 and the falling sections G2 with respect to the cylinder extending direction Y when seen in the direction Z as shown in FIG. 6(a), and the acute angle formed by each of the folded sections G3 with respect to the direction Z when seen in the cylinder extending direction Y as shown in FIG. 6(c) are smaller than those in the heat transfer tube group 70A. However, those acute angles in the heat transfer tube group 70B are also designed so that the partial density of the heat transfer tubes 71B in the folded sections G3 becomes higher than the partial density of the heat transfer tubes 71B in the rising sections G1 and the falling sections G2.

The one end section G4 is the end section provided on the side of the high-temperature cylinder 20. Specifically, of the heat transfer tubes 71B, the portions that extend from one end located at a middle point between the first and second planes S1 and S2 to the first plane S1 obliquely upward with respect to the cylinder extending direction Y while extending perpendicularly to the cylinder aligning direction X, and are connected to the portions forming the rising section G11 located on the side of the one end are arranged as a group in a single row in the cylinder aligning direction X. In this manner, the one end section G4 is formed.

The other end section G5 is the end section provided on the side of the low-temperature cylinder 30. Specifically, of the heat transfer tubes 71B, the portions that extend from the other end located at a middle point between the first and second planes S1 and S2 to the second plane S2 obliquely upward with respect to the cylinder extending direction Y while extending perpendicularly to the cylinder aligning direction X, and are connected to the portions forming the falling section G22 located on the side of the other end are arranged as a group in a single row in the cylinder aligning direction X. In this manner, the other end section G5 is formed.

It should be noted that the one end section G4 and the other end section G5 may be formed in the same manner as in the heat transfer tube group 70A, for example.

Figure 7C:
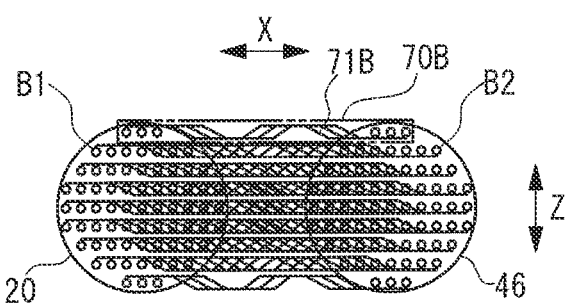
Figure 7B:
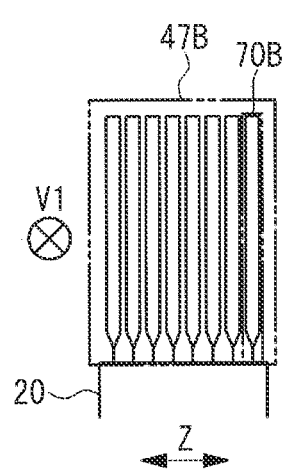
Figure 7A:
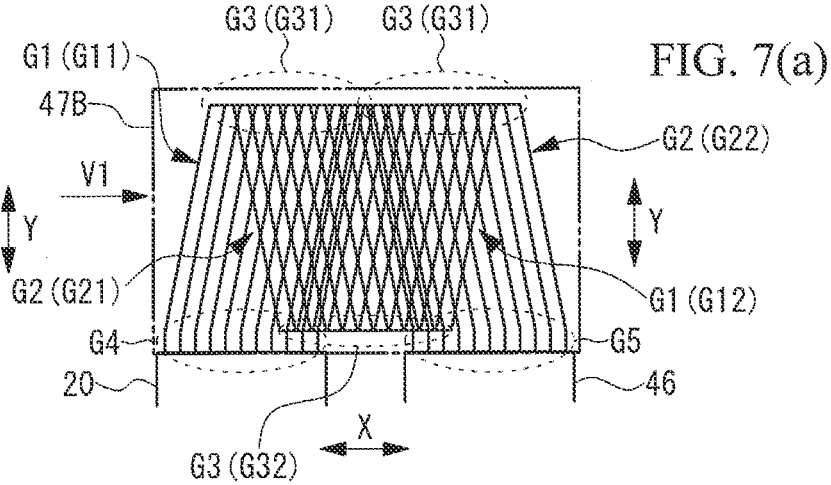

This heat transfer tube group 70B is used in the heater 47B as specifically illustrated in FIGS. 7(a) through 7(c). In the heater 47B, first and second heat transfer tube connecting ports B1 and B2 are provided as in the heater 47A. In the heater 47B, the heat transfer tubes 71B are provided for the respective sets of the first and second heat transfer tube connecting ports B1 and B2 arranged in the same layouts. In each position in the direction Z, the heat transfer tubes 71B arranged linearly and parallel to one another at regular intervals in the cylinder aligning direction X are provided for the first and second heat transfer tube connecting ports B1 and B2 arranged in the same straight line in the cylinder aligning direction X. In this manner, heat transfer tube groups 70B are formed. In each of the heat transfer tube groups 70B, the rising sections G1 and the falling sections G2 are provided so that a space is formed in between when seen in the cylinder aligning direction X as shown in FIG. 7(b).

Next, the functions and effects of the heater 47B are described. In the heater 47B, the folded sections G3 are provided, so that another rising section G1 and another falling section G2 can be added to the heater 47A. That is, as the folded sections G3 are provided in the heater 47B, the entire length of each of the heat transfer tubes 71B constituting each heat transfer tube group 70B can be made longer than the entire length of each of the heat transfer tubes 71A constituting each heat transfer tube group 70A. Accordingly, a larger heat transfer area than that in the heater 47A can be secured.

In the heater 47B, the substantially M-shaped heat transfer tubes 71B constitute each heat transfer tube group 70B. In this structure, the folded sections G3 are provided so that the folded section G32 is located between the folded sections G31 adjacent to each other in the cylinder aligning direction X, which is the aligning direction of the heat transfer tubes 71B. In this manner, a small-sized structure is maintained. It should be noted that, among the folded sections G31 and G32, there may be overlapping portions at locations in the cylinder aligning direction X.

Accordingly, the heater 47B can maintain a smaller structure than that of the heater 47A, and can further increase its heat exchange capability. In view of this, an even higher heat exchange capability can be achieved.

Third Embodiment

Figure 8:
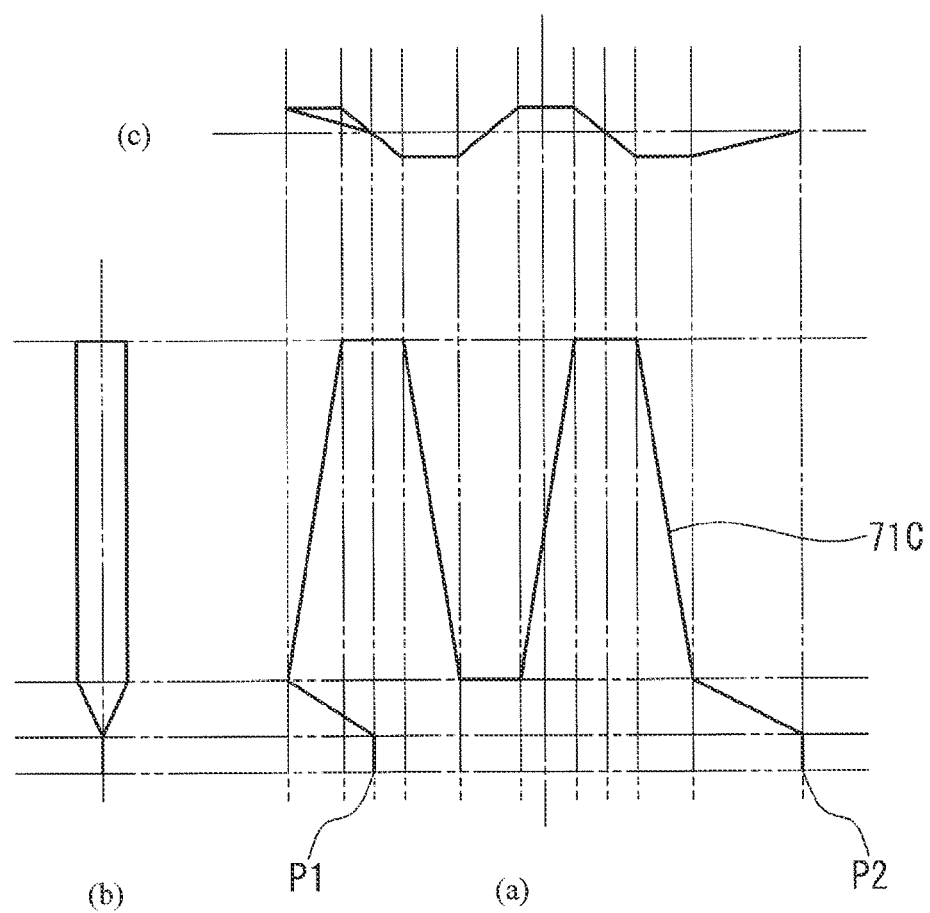
FIG. 8 is a diagram showing a heat transfer tube according to a third embodiment, wherein part (a) is a front view; part (b) is a side view; and part (c) is a top view.

A heater 47C according to this embodiment serves as a multitubular heat exchanger, and includes heat transfer tubes 71C shown in FIG. 8. Instead of the heater 47A, the heater 47C can be provided in the stirling engine 10A, for example. Each of the heat transfer tubes 71C does not have a form axisymmetrical about the center axis thereof, but has an asymmetrical form including substantially M-shaped portions. The asymmetrical form is tilted to one end. A first working fluid inlet/outlet P1 is provided at one end of each heat transfer tube 71C, and a second working fluid inlet/outlet P2 is provided at the other end.

Figure 9:
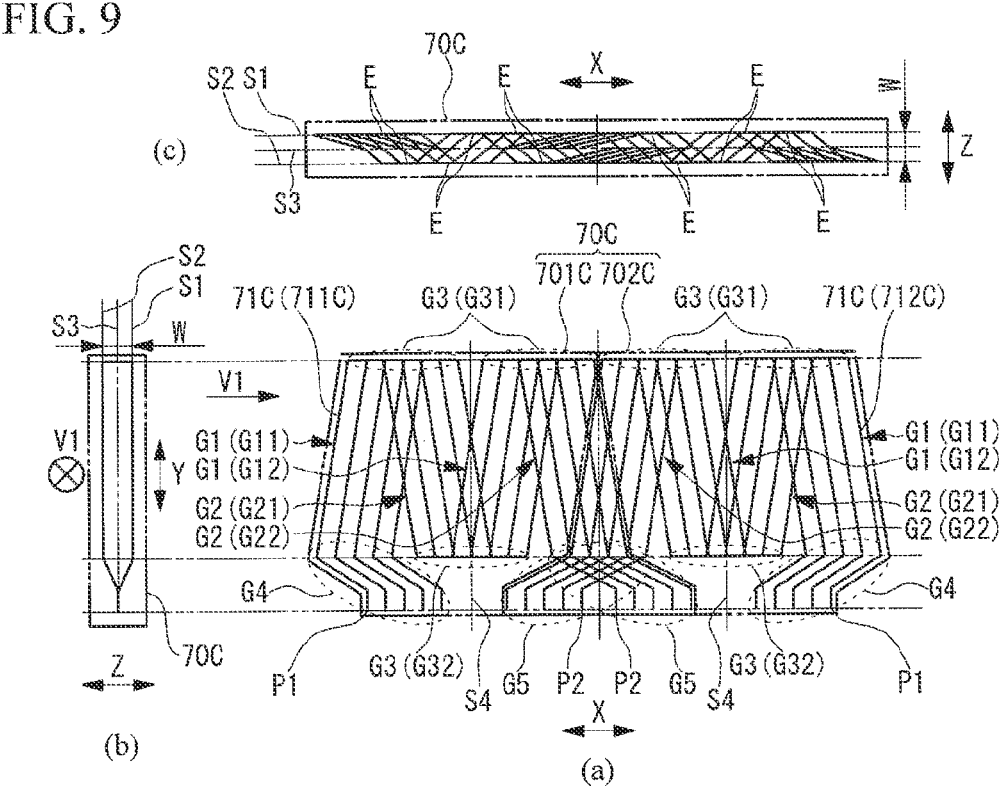
FIG. 9 is a diagram showing a heat transfer tube group according to the third embodiment, wherein part (a) is a front view; part (b) is a side view; and part (c) is a top view.

The heat transfer tubes 71C constitute a heat transfer tube group 70C as shown in FIG. 9. In FIG. 9, ten heat transfer tubes 71C are shown as the heat transfer tubes 71C constituting the heat transfer tube group 70C, for ease of explanation. Specifically, the heat transfer tube group 70C is formed with the heat transfer tubes 71C arranged as a group in a single row. More specifically, the heat transfer tube group 70C is formed with the heat transfer tubes 71C arranged linearly and parallel to one another at regular intervals. In this regard, the heat transfer tubes 71C constituting the heat transfer tube group 70C are arranged linearly with respect to one another in the cylinder aligning direction X. Accordingly, when seen in the direction Z, the heat transfer tubes 71C have horizontally asymmetrical forms tilted to one end, with the cylindrical engine aligning direction X being regarded as the horizontal direction as shown in FIG. 9(a). The heat transfer tubes 71C constituting the heat transfer tube group 70C have the same lengths and the same shapes.

The heat transfer tubes 71C constituting the heat transfer tube group 70C include first heat transfer tubes 711C and second heat transfer tubes 712C. One end and the other end of each first heat transfer tube 711C face the opposite direction of those of each second heat transfer tube 712C, so that the tilted forms are tilted away from each other. Of the heat transfer tubes 71C, each first transfer tube 711C is a heat transfer tube having its one end on the side of the high-temperature cylinder 20, and each second transfer tube 712C is a heat transfer tube having its other end on the side of the high-temperature cylinder 20. More specifically, of the heat transfer tubes 71C, the one end of each first heat transfer tube 711C includes the center axis line of the high-temperature cylinder 20, and is located on the outer side of a plane S4 parallel to the direction Z. Of the heat transfer tubes 71C, each second heat transfer tube 712C is a heat transfer tube that has its other end located on the inner side of a plane S4. The number of the first heat transfer tubes 711C is half the number of the heat transfer tubes 71C, and the number of the second heat transfer tubes 712C is also half the number of the heat transfer tubes 71C.

In the heat transfer tube group 70C, the first heat transfer tubes 711C constitute a first partial heat transfer tube group 701C, and the second heat transfer tubes 712C constitute a second partial heat transfer tube group 702C. Specifically, the first partial heat transfer tube group 701C is formed with the first heat transfer tubes 711C arranged linearly and parallel to one another at regular intervals, and the second partial heat transfer tube group 702C is formed with the second heat transfer tubes 712C arranged linearly and parallel to one another at regular intervals. When the heat transfer tube group 70C is seen as a whole, the first partial heat transfer tube group 701C has one end and the other end facing the opposite direction of those of the second partial heat transfer tube group 702C, so that the tilted forms are tilted away from each other.

Each of the first and second partial heat transfer tube groups 701C and 702C includes two rising sections G1, two falling sections G2, three folded sections G3, one end section G4, and the other end section G5.

Each of the two rising sections G1 is formed with rising sections G11 and G12, is located along a first plane S1 in the first partial heat transfer tube group 701C, and is located along a second plane S2 in the second partial heat transfer tube group 702C. The two rising sections G1 extend parallel to each other in each of the first and second partial heat transfer tube groups 701C and 702C. Specifically, the acute angle formed by each of the two rising sections G1 with respect to the cylinder extending direction Y is smaller than the acute angle formed by each of the two rising sections G1 with respect to the cylinder extending direction Y in the heat transfer tube group 70B described in the second embodiment.

Each of the two falling sections G2 is formed with falling sections G21 and G22, is located along the second plane S2 in the first partial heat transfer tube group 701C, and is located along the first plane S1 in the second partial heat transfer tube group 702C.

The two falling sections G2 extend parallel to each other in each of the first and second partial heat transfer tube groups 701C and 702C. Specifically, the acute angle formed by each of the two falling sections G2 with respect to the cylinder extending direction Y is smaller than the acute angle formed by each of the two falling sections G2 with respect to the cylinder extending direction Y in the heat transfer tube group 70B.

The three folded sections G3 formed with two folded sections G31 and one folded section G32 connect the rising sections G1 and the falling sections G2 in each of the first and second partial heat transfer tube groups 701C and 702C as in the heat transfer tube group 70B, and the acute angle formed by each of the three folded sections G3 with respect to the direction Z is the same as that in the heat transfer tube group 70B. Accordingly, a pair of folded end sections E are provided at each of the three folded sections G3 as in the heat transfer tube group 70B, and the rising sections G1 and the falling sections G2 are arranged so that a space is formed in the offset direction between those sections when seen in the cylinder aligning direction X as shown in FIG. 9(b).

The one end section G4 is the end section provided on the side of the high-temperature cylinder 20 in the first partial heat transfer tube group 701C, and is the end section provided on the side of the low-temperature cylinder 30 in the second partial heat transfer tube group 702C. Specifically, of the heat transfer tubes 71C, the portions that extend in the cylinder extending direction Y from one end located at the middle point between the first and second planes S1 and S2, further extend obliquely upward with respect to the cylinder aligning direction X and the cylinder extending direction Y toward the first plane S1 in the first partial heat transfer tube group 701C and toward the second plane S2 in the second partial heat transfer tube group 702C, and are connected to the portions forming the rising section G1 located on the side of the one end and are arranged as a group in a single row in the cylinder aligning direction X. In this manner, the one end section G4 is formed.

The other end section G5 is the end section provided on the side of the low-temperature cylinder 30 in the first partial heat transfer tube group 701C, and is the end section provided on the side of the high-temperature cylinder 20 in the second partial heat transfer tube group 702C. Specifically, of the heat transfer tubes 71C, the portions that extend in the cylinder extending direction Y from the other end located at the middle point between the first and second planes S1 and S2, further extend obliquely upward with respect to the cylinder aligning direction X and the cylinder extending direction Y toward the second plane S2 in the first partial heat transfer tube group 701C and toward the first plane S1 in the second partial heat transfer tube group 702C, and are connected to the portions forming the falling section G2 located on the side of the other end and are arranged as a group in a single row in the cylinder aligning direction X. In this manner, the other end section G5 is formed.

Each of the first and second partial heat transfer tube groups 701C and 702C is asymmetrical, having a form tilted to one end. Specifically, as for the tilted form, each of the first and second partial heat transfer tube groups 701C and 702C has an asymmetrical form, since the folded sections G3 are tilted to one end. The heat transfer tube group 70C is formed with the heat transfer tubes 71C that have forms tilted to one end and to the other end when the heat transfer tube group 70C is seen as a whole.

Figure 10:
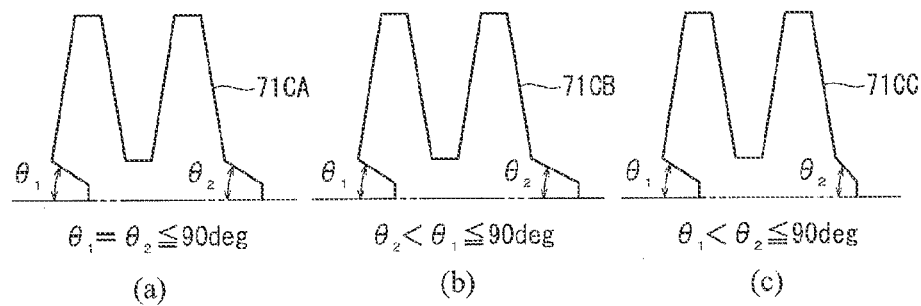
FIG. 10 is a diagram for explaining the heat transfer tubes according to the third embodiment.

As specifically shown in FIG. 10, each of the heat transfer tubes 71C constituting the first and second partial heat transfer tube groups 701C and 702C is designed so that, when seen in the direction Z, the angle θ1 formed outside by the one end section G4 with respect to the straight line that includes the one end and extends in the cylinder aligning direction X, and the angle θ2 formed inside by the other end section G5 with respect to the straight line that includes the other end and extends in the cylinder aligning direction X are 90 degrees or smaller.

More specifically, the one end section G4 and the other end section G5 have forms that can be realized by a heat transfer tube 71CA shown in FIG. 10(a), a heat transfer tube 71CB shown in FIG. 10(b), or a heat transfer tube 71CC shown in FIG. 10(c). The heat transfer tube 71CA is designed so that the angles θ1 and θ2 become equal to each other. The heat transfer tube 71CB is designed so that the angle θ1 becomes larger than the angle θ2. The heat transfer tube 71CC is designed so that the angle θ1 becomes smaller than the angle θ2.

Figure 11:
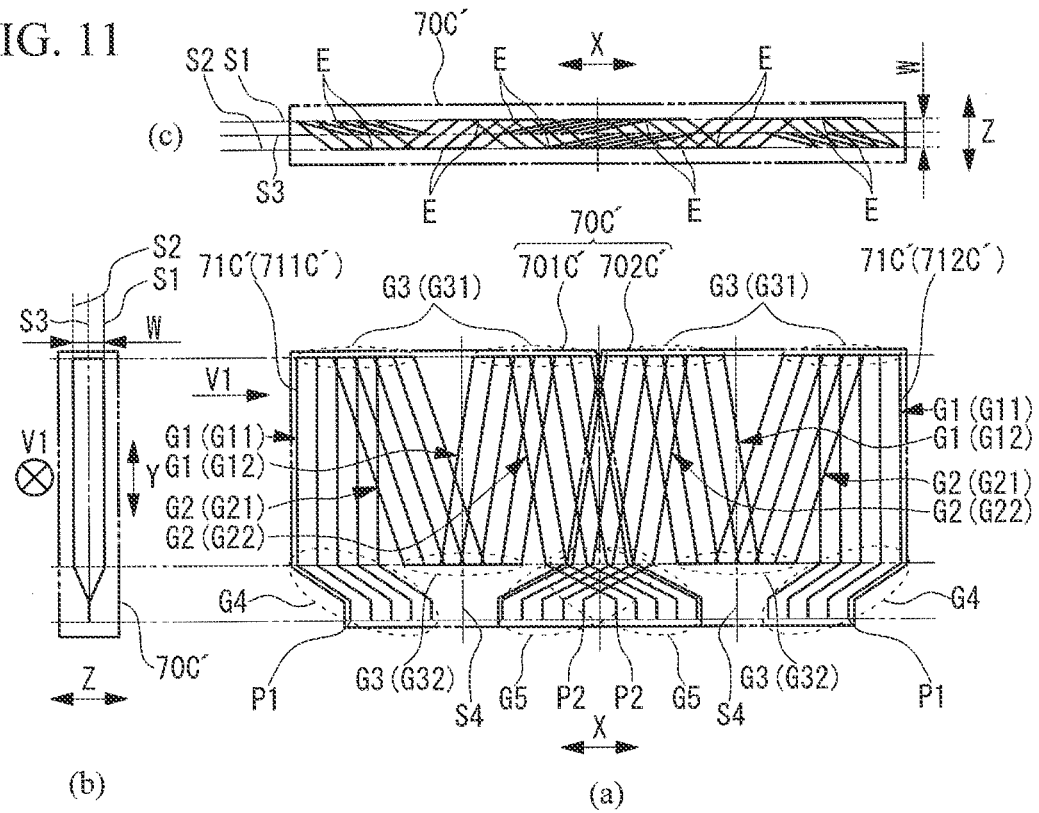
FIG. 11 is a diagram showing a modification of the heat transfer tube group according to the third embodiment.

Further, asymmetrical forms tilted to one end can also be realized by the heat transfer tubes 71C' constituting a heat transfer tube group 70C' shown in FIG. 11, for example, instead of the heat transfer tubes 71C.

Like the heat transfer tube group 70C, the heat transfer tube group 70C' includes the heat transfer tubes 71C' that have forms tilted to one end and to the other end when the heat transfer tube group 70C' is seen as a whole. In the heat transfer tube group 70C', the heat transfer tubes 71C' constituting the heat transfer tube group 70C include first heat transfer tubes 711C' and second heat transfer tubes 712C'. Each of the first heat transfer tubes 711C has one end and the other end facing the opposite direction of those of each of the second heat transfer tubes 712C', so that the tilted forms are tilted away from each other. In the heat transfer tube group 70C', the first and second heat transfer tubes 711C' and 712C' constitute first and second partial heat transfer tube groups 701C' and 702C'. The first partial heat transfer tube group 701C' has one end and the other end facing the opposite direction of those of the second partial heat transfer tube group 702C', so that the tilted forms are tilted away from each other.

In the heat transfer tube group 70C', two rising sections G1 extend non-parallel to each other in each of the first and second partial heat transfer tube groups 701C' and 702C'. Also, in the heat transfer tube group 70C', two falling sections G2 extend non-parallel to each other in each of the first and second partial heat transfer tube groups 701C' and 702C'. That is, each two rising sections G1 may extend non-parallel to each other as in the heat transfer tube group 70C', and each two falling sections G2 may extend non-parallel to each other as in the heat transfer tube group 70C', for example.

Figure 12:
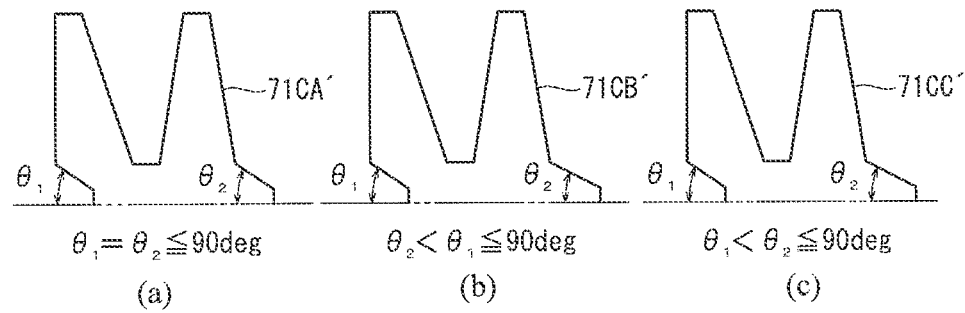
FIG. 12 is a diagram for explaining modifications of the heat transfer tubes according to the third embodiment.

In the heat transfer tube group 70C', each of the angles θ1 and θ2 is 90 degrees or smaller. More specifically, one end section G4 and the other end section G5 have forms that can be realized by a heat transfer tube 71CA' shown in FIG. 12(a) in which the angles θ1 and θ2 are equal to each other, a heat transfer tube 71CB' shown in FIG. 12(b) in which the angle θ1 is larger than the angle θ2, or a heat transfer tube 71CC' shown in FIG. 12(c) in which the angle θ1 is smaller than the angle θ2, as in the heat transfer tube group 70C. In this regard, even if the angles θ1 and θ2 are both 90 degrees, each of the heat transfer tubes 71C' has an asymmetrical form tilted to one end. That is, an asymmetrical form tilted to one end can be realized not only by adjusting the angles θ1 and θ2 but also by adjusting the extending fashion of the rising sections G1 and the falling sections G2, for example. In view of this, in designing an asymmetrical form tilted to one end, the angles θ1 and θ2 are both set at 90 degrees or smaller.

Figure 13:
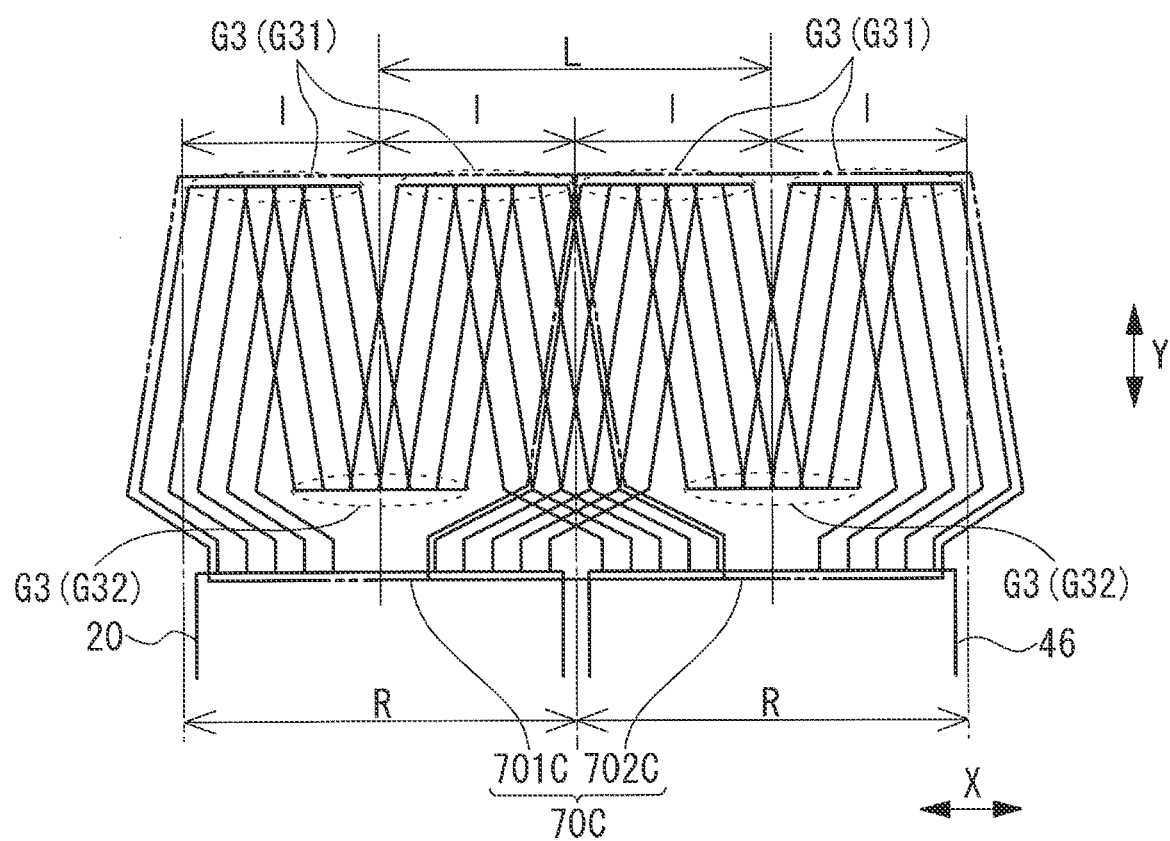
FIG. 13 is a diagram for explaining the heat transfer tube group according to the third embodiment.

The heat transfer tube groups 70C can be provided in accordance with the first and second heat transfer tube connecting ports B1 and B2 arranged in the same manner as in the heater 47B, for example. In this regard, in each of the first and second partial heat transfer tube groups 701C and 702C as the partial heat transfer tube groups, all the folded sections G3 are designed to fall within a range R with a length equal to the length of a bore pitch L in the cylinder aligning direction X, which is the aligning direction of the heat transfer tubes 71C, as illustrated in FIG. 13.

Also, in each of the first and second partial heat transfer tube groups 701C and 702C, each of the folded sections G31 is designed to fall within a range with a length l that is calculated by dividing the length of the bore pitch L by the number n (2 in this case) of the folded sections G31. The respective ranges each having the length l equally divide the range R. Those folded sections G31 are sequentially arranged from one end to the other end. Each of the folded sections G32 is interposed between two folded sections G31 adjacent to each other in the cylinder aligning direction X. Here, there may be overlapping portions between the folded sections G31 and G32 in the cylinder aligning direction X.

Further, in each of the first and second partial heat transfer tube groups 701C and 702C, the folded sections G31 located at both ends can be designed so as not to protrude from the respective bores of the cylinders 20 and 30 when seen in the cylinder extending direction Y. However, the layout of the folded sections G31 located at both ends is not limited to that, and those folded sections G31 located at both ends may be designed so as to protrude from the respective bores of the cylinders 20 and 30 in an outward offsetting manner in the cylinder aligning direction X. It should be noted that the regenerator 46 and the low-temperature cylinder 30 share the same axis and have the same diameters.

Meanwhile, the range R is designed to extend in the cylinder aligning direction X from the center of the bore pitch L when the heat transfer tube group 70C is seen as a whole.

Figure 14:
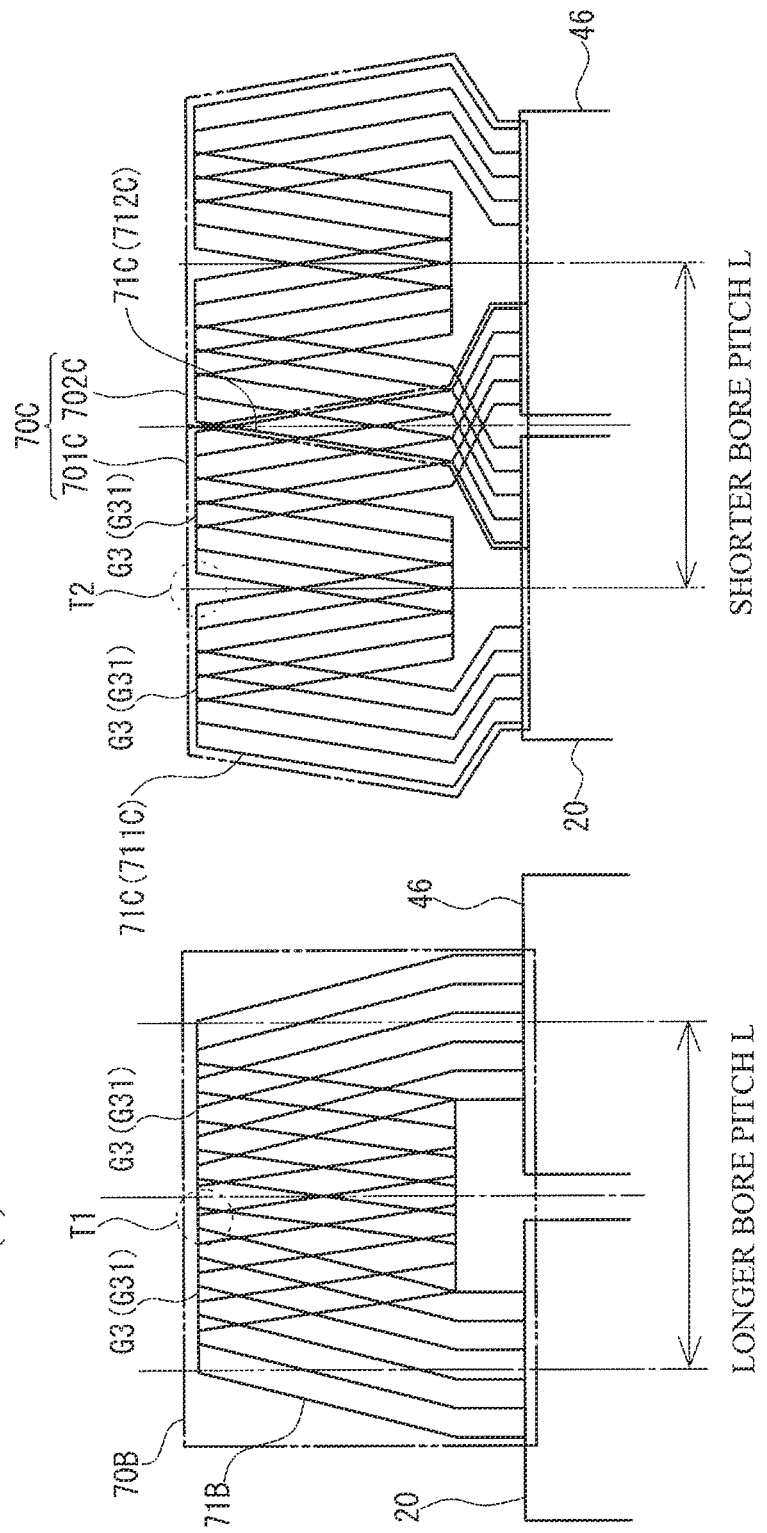
FIGS. 14(a) and 14(b) are diagrams for explaining a comparison between the heat transfer tube groups according to the second and third embodiments.

Next, the functions and effects of the heater 47C are described. In the heater 47B, if adjacent folded sections G31 interfere with one another at a point T1 as illustrated in FIG. 14(a), the number of the heat transfer tubes 71B constituting the heat transfer tube group 70B cannot be increased even when the number of the heat transfer tubes 71B is required to be increased. In the heater 47C, if adjacent folded sections G31 in the first partial heat transfer tube group 701C interfere with one another at a point T2 as illustrated in FIG. 14(b), the number of the first heat transfer tubes 711C as the heat transfer tubes 71C constituting the first partial heat transfer tube group 701C cannot be increased.

In the heater 47C, however, the heat transfer tubes 71C each have an asymmetrical form that is tilted. Therefore, the second heat transfer tubes 712C each having one end and the other end facing the opposite direction of those of each of the first heat transfer tubes 711C are provided, so that the tilted forms are tilted away from each other. Accordingly, the number of the heat transfer tubes 71C constituting the heat transfer tube group 70C can be further increased in the structure. In the heater 47C, the number of the first and second heat transfer tube connecting ports B1 and B2 in the cylinder aligning direction X can be made larger than that in the heater 47B, so that more heat transfer tubes 71C can be added to the heat transfer tube group 70C. With this arrangement, the heater 47C can have a higher heat exchange capability than that of the heater 47B.

In the heater 47C, by further increasing the number of the heat transfer tubes 71C constituting the heat transfer tube group 70C in the above manner, the adjacent folded sections G31 in the first partial heat transfer tube group 701C can be prevented from interfering with one another. Accordingly, interferences among the folded sections G31 can be prevented from restricting a reduction in the length of the bore pitch L in the structure. In view of this, the heater 47C can also be used in a stirling engine with a shorter bore pitch L than that in the heater 47B. In other words, compared with the heater 47B, the heater 47C can make a greater contribution to downsizing a stirling engine.

In each of the first and second partial heat transfer tube groups 701C and 702C in the heater 47C, all the folded sections G3 in the cylinder aligning direction X fall within the range R having the length equal to the length of the bore pitch L in the cylinder aligning direction X. With this arrangement, each of the first partial heat transfer tube groups 701C and 702C can be designed to have a small size in the cylinder aligning direction X in the heater 47C, even if those partial heat transfer tube groups 701C and 702C include the folded sections G3 in tilted forms.

Also, in each of the first and second partial heat transfer tube groups 701C and 702C in the heater 47C, the position of each of the folded sections G31 in the cylinder aligning direction X falls within the range with the length l calculated by equally dividing the range R, and the folded sections G31 are sequentially arranged from one end to the other end. At the same time, in each of the first and second partial heat transfer tube groups 701C and 702C in the heater 47C, the folded sections G32 in the cylinder aligning direction X are located between the adjacent folded sections G31. With this arrangement, each of the partial heat transfer tube groups 701C and 702C in the heater 47C can be designed to have a reasonable shape and a small size in the cylinder aligning direction X.

In the heater 47C, the range R extends in the cylinder aligning direction X from the center of the bore pitch L, so that the heat transfer tube group 70C can be suitably designed to have a small size in the cylinder aligning direction X when the heat transfer tube group 70C is seen as a whole.

In each of the first and second partial heat transfer tube groups 701C and 702C in the heater 47C, the folded sections G31 located at both ends can be designed so as to protrude from the respective bores of the cylinders 20 and 30. However, the folded sections G31 located at both ends are designed so as not to protrude from the respective bores of the cylinders 20 and 30. Accordingly, the heat transfer tube group 70C can be suitably designed to have a small size in the cylinder aligning direction X.

The above described embodiments are examples of preferred embodiments of the present invention. However, the present invention is not limited to those embodiments, and various modifications may be made to them without departing from the scope of the invention.

For example, in the above described first embodiment, the heat transfer tube group 70A is used. In the heat transfer tube group 70A, a pair of folded end sections E are provided at the folded section G3, and the rising section G1 and the falling section G2 are arranged so that a space is formed in between in the offset direction. Further, the rising section G1 is located along the first plane S1, and the falling section G2 is located along the second plane S2. However, the present invention is not limited to this arrangement, and a heat transfer tube group having such characteristics can be realized by the following heat transfer tube group, for example.

Figure 15:
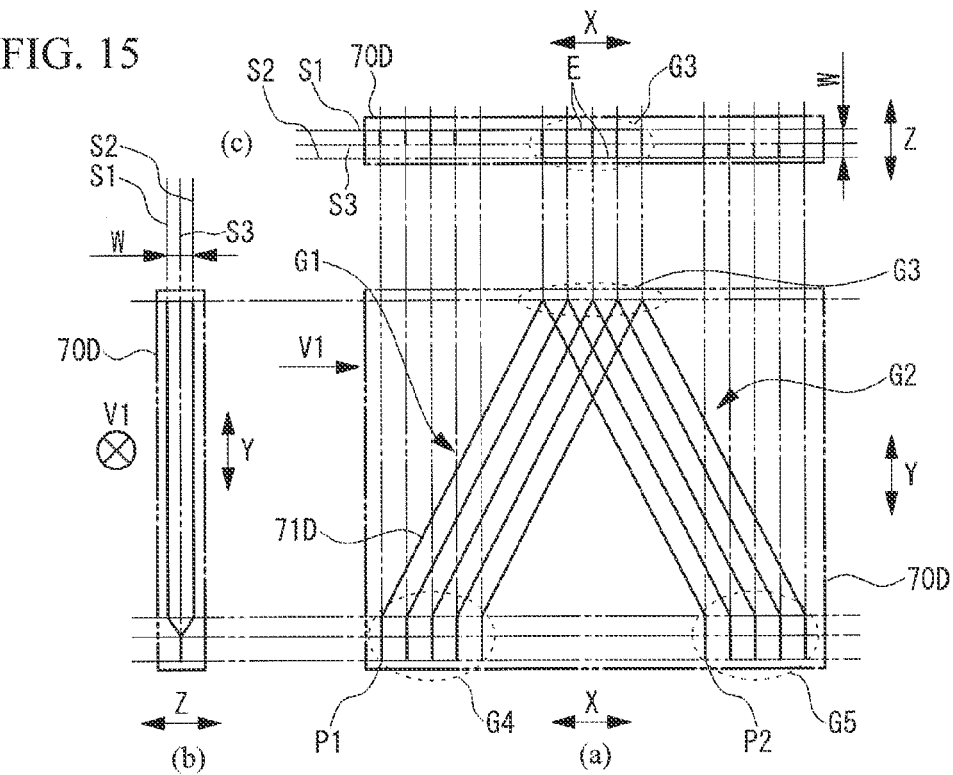
FIG. 15 is a diagram showing a first modification of heat transfer tubes and a heat transfer tube group, wherein part (a) is a front view; part (b) is a side view; and part (c) is a top view.

For example, a heat transfer tube group 70D shown in FIG. 15 differs from the heat transfer tube group 70A in that the folded section G3 extends in the direction Z. The heat transfer tube group 70D is formed with heat transfer tubes 71D that differ from the heat transfer tubes 71A in the portions forming the folded section G3. This heat transfer tube group 70D also has the above described characteristics, and can achieve the effects based on such characteristics like the heat transfer tube group 70A. In this case, the partial density of the heat transfer tubes 71D in the folded section G3 is lower than the partial density of the heat transfer tubes 71D in the rising section G1 and the falling section G2.

Figure 16:
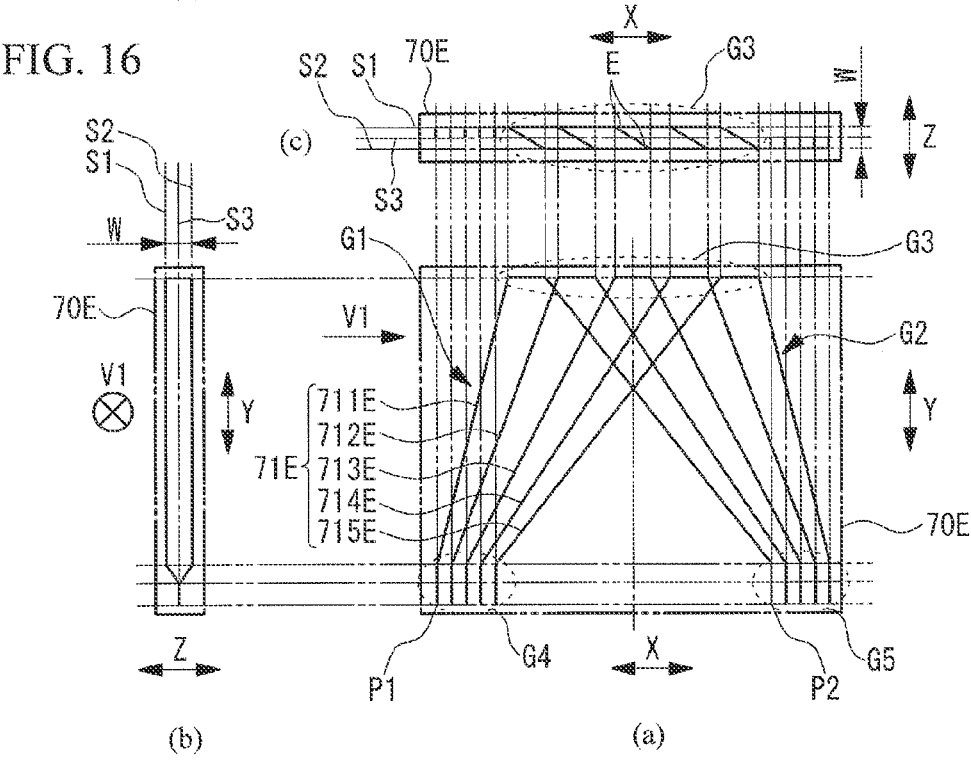
FIG. 16 is a diagram showing a second modification of heat transfer tubes and a heat transfer tube group, wherein part (a) is a front view; part (b) is a side view; and part (c) is a top view.

A heat transfer tube group 70E shown in FIG. 16 differs from the heat transfer tube group 70A in that the portions forming the folded section G3 are arranged at regular intervals that are wider than the intervals between the first and second working fluid inlets/outlets P1 and P2, for example. Also, the portions forming the folded section G3 are arranged to spread uniformly in the entire structure. Therefore, instead of the heat transfer tubes 71A, the heat transfer tube group 70E is formed with heat transfer tubes 711E through 715E as heat transfer tubes 71E that are different from one another.

Specifically, the heat transfer tubes 71E differ from the heat transfer tubes 71A in that, when seen in the direction Z as shown in FIG. 16($a$), the acute angle formed by the portion forming the rising section G1 and the cylinder extending direction Y becomes gradually larger, and the acute angle formed by the portion forming the falling section G2 and the cylinder extending direction Y gradually becomes smaller, from the heat transfer tube 711E located at one end to the heat transfer tube 715E located at the other end in the heat transfer tube group 70E. Also, the heat transfer tube group 70E has an axisymmetrical form about its center axis. However, this heat transfer tube group 70E also has the above described characteristics, and can achieve the effects based on such characteristics like the heat transfer tube group 70A.

In this case, the heat transfer tubes 71E cannot have the same shapes. Also, the density of heat transfer tube groups 70E cannot be made higher by defining the relationship between the partial density of the heat transfer tubes 71E in the folded section G3 and the partial density of the heat transfer tubes 71E in the rising section G1 and the falling section G2.

A heat transfer tube group 70F shown in FIG. 17 differs from the heat transfer tube group 70A in that the one end section G4 is in the first plane S1, and the other end section G5 is in the second plane S2, for example. The heat transfer tube group 70F is formed with heat transfer tubes 71F that differ from the heat transfer tubes 71A in that the portions forming the one end section G4 and the other end section G5 are modified in the same manner. Accordingly, in the heat transfer tube group 70F, the first plane S1 includes the first working fluid inlets/outlets P1, and the second plane S2 includes the second working fluid inlets/outlets P2. However, this heat transfer tube group 70F also has the above described characteristics, and can achieve the effects based on such characteristics like the heat transfer tube group 70A.

In this case, the first and second working fluid inlets/outlets P1 and P2 cannot be arranged in the same straight line. Therefore, the layouts of the first and second working fluid inlets/outlets P1 and P2 in this case become more complicated than those in the heater 47A. Specifically, as in a heater 47F shown in FIGS. 18($a$) through 18($c$), a modification needs to be made so that the position in which the number of first heat transfer tube connecting ports B1 arranged in the cylinder aligning direction X becomes equal to the number of second heat transfer tube connecting ports B2 arranged in the cylinder aligning direction X is offset by a distance W, for example.

A heat transfer tube group 70G shown in FIG. 19 differs from the heat transfer tube group 70A in that a direction intersecting with the direction Z is set as the offset direction, and the folded end sections W are made to equally offset each other with the distance W, for example. Also, the rising section G1 and the one end section G4 are in a first plane S1' (not shown), and the falling section G2 and the other end section G5 are in a second plane S2' (not shown). The heat transfer tube group 70G is formed with heat transfer tubes 71G that differ from the heat transfer tubes 71A in the respective portions forming the rising section G1, the falling sections G2, the one end section G4, and the other end section G5. The first plane S1' and the second plane S2' are planes that intersect with the cylinder aligning direction X. The first plane S1' includes the first working fluid inlets/outlets P1, and the second plane S1' includes the second working fluid inlets/outlets P2. However, this heat transfer tube group 70G also has the above described characteristics, and can achieve the effects based on such characteristics like the heat transfer tube group 70A.

As in a heater 47G shown in FIGS. 20(a) through 20(c), heat transfer tube groups 70G can be suitably positioned in accordance with the first and second heat transfer tube connecting ports B1 and B2 arranged at regular intervals in a direction at a predetermined angle (45 degrees in this case) with respect to the cylinder aligning direction X and in a direction perpendicular to the direction at the predetermined angle. To avoid complexity in the drawing, FIG. 20 show only one heat transfer tube 71G for each of the heat transfer tube groups 70G. The heat transfer tubes 71G can also be arranged linearly in the cylinder aligning direction X, to form a heat transfer tube group.

In other words, the heat transfer tubes 71F and 71G can be regarded as heat transfer tubes that can cope with a situation where the layouts of the first and second heat transfer tube connecting ports B1 and B2 are complicated. The same modification as this can also be made to the heat transfer tubes 71B described in the second embodiment and to the heat transfer tubes 71C described in the third embodiment.

In the above described embodiments, respective heat transfer tubes such as the heat transfer tubes 71A are SUS tubes, for example. However, the present invention is not limited to that, and those tubes may be tubes each having an elliptical cross-sectional surface or tubes each having some other shape.

Also, in the above described embodiments, each heat transfer tube group such as the heat transfer tube group 70A includes the folded section G3 that connects the rising section G1 and the falling section G2 as if to fold back those sections toward each other. However, the present invention is not limited to that. Instead of the folded section, each tube group may include a connecting section that smoothly connects the rising section and the falling section as if to turn each of those sections back.

DESCRIPTION OF LETTERS OR NUMERALS

10 A stirling engine
20 high-temperature cylinder
21 expansion piston
22 high-temperature cylinder housing
30 low-temperature cylinder
31 compression piston
32 low-temperature cylinder housing
47A, 47B, 47C, 47F, 47G heater
50 grasshopper mechanisms
70A, 70A', 70B, 70C, 70D, 70E, 70F, 70G heat transfer tube group(s)
71A, 71B, 71C, 71CA, 71CB, 71CC, 71D, 71E, 71F, 71G heat transfer tubes

The invention claimed is:

1. A heat exchanger for a stirling engine, comprising
a tube group comprising a plurality of tubes configured to cause a working fluid of the stirling engine to flow between two cylinders arranged linearly and parallel to each other in the stirling engine, the stirling engine being of a twin-cylinder a type,
wherein the tube group comprises a rising section extending upward, a falling section extending downward, and a connecting section connecting the rising section and the falling section in a turn-back manner, where the tube group is regarded as extending from one end thereof,
wherein the rising section is located along a first plane parallel to an aligning direction of the cylinders and an extending direction of the cylinders, and the falling section is located along a second plane parallel to the first plane.

2. The heat exchanger of claim 1, wherein
the connecting section is a folded section connecting the rising section and the falling section in a fold-back manner,
the folded section comprises a pair of folded end sections to which the rising section and the falling section are connected, and
the pair of folded end sections offset each other, an offset distance between the pair of folded end sections being set at a distance in which a space can be formed between the rising section and the falling section in the offset direction, the rising section and the falling section being arranged to form the space therebetween in the offset direction.

3. The heat exchanger of claim 1, wherein
in the tube group, the connecting section comprises a plurality of connecting sections.

4. The heat exchanger of claim 1, wherein
in the tube group, the connecting section comprises a plurality of connecting sections, and
a rising section formed by the plurality of connecting sections is located along the first plane, and a falling section formed by the plurality of connecting sections is located along the second plane.

5. The heat exchanger of claim 1, wherein
the tubes have the same lengths.

6. The heat exchanger of claim 1, wherein
the tubes have the same lengths and the same shapes.

7. The heat exchanger of claim 6, wherein
a partial density of the tubes in the connecting section is higher than a partial density of the tubes in the rising section and the falling section.

8. The heat exchanger of claim 1, wherein
the tubes each have a form that is asymmetrical and is tilted to one end, and
the tube group comprises a first partial tube group and a second partial tube group arranged to tilt the tilted forms away from each other, one end and the other end of the first partial tube group facing the opposite direction of one end and the other end of the second partial tube group.

9. The heat exchanger of claim 8, wherein,
in the first partial tube group, the rising section is located along the first plane, and the falling section is located along the second plane, and
in the second partial tube group, the rising section is located along the second plane, and the falling section is located along the first plane.

10. The heat exchanger of claim 9, wherein
the connecting section comprises a plurality of connecting sections, and
of the connecting sections, respective connecting sections connecting the rising section and the falling section in such a manner to turn back the falling section toward the rising section fall within respective corresponding ranges each having a length calculated by dividing a bore pitch length of the two cylinders by the number of the respective connecting sections, the respective corresponding ranges equally dividing a range having a length equal to the bore pitch length, the connecting sections being sequentially arranged from one end to the other end when the one end being regarded as a starting point.

* * * * *